US011437061B1

(12) United States Patent
Le et al.

(10) Patent No.: US 11,437,061 B1
(45) Date of Patent: Sep. 6, 2022

(54) READ HEAD HAVING ONE OR MORE ANTIFERROMAGNETIC LAYERS ABOVE SOFT BIAS SIDE SHIELDS, AND RELATED METHODS

(71) Applicant: Western Digital Technologies, Inc., San Jose, CA (US)

(72) Inventors: Quang Le, San Jose, CA (US); Hongquan Jiang, San Jose, CA (US); Cherngye Hwang, San Jose, CA (US); Hisashi Takano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/359,171

(22) Filed: Jun. 25, 2021

(51) Int. Cl.
*G11B 5/39* (2006.01)
*G11B 5/31* (2006.01)

(52) U.S. Cl.
CPC .......... *G11B 5/3932* (2013.01); *G11B 5/3912* (2013.01); *G11B 5/3958* (2013.01); *G11B 5/3116* (2013.01); *G11B 5/3163* (2013.01)

(58) Field of Classification Search
None
See application file for complete search history.

(56) References Cited

U.S. PATENT DOCUMENTS

| 5,436,778 | A | 7/1995 | Lin et al. |
| 5,530,608 | A | 6/1996 | Aboaf et al. |
| 5,574,605 | A | 11/1996 | Baumgart et al. |
| 5,656,485 | A | 8/1997 | Jacobson et al. |
| 5,923,505 | A | 7/1999 | Kroes et al. |
| 5,962,153 | A | 10/1999 | Kirino et al. |
| 5,963,401 | A | 10/1999 | Dee et al. |
| 5,995,338 | A | 11/1999 | Watanabe et al. |

(Continued)

FOREIGN PATENT DOCUMENTS

| EP | 2026337 B1 | 12/2010 |
| JP | H06259730 A | 9/1994 |

(Continued)

OTHER PUBLICATIONS

Cannon, D. M. et al., "Design and performance of a magnetic head for a high-density tape drive", IBM J. Res. Develop., vol. 30, No. 3, May 1986, pp. 270-277.

(Continued)

*Primary Examiner* — Craig A. Renner
(74) *Attorney, Agent, or Firm* — Patterson + Sheridan, LLP; Steven H. VerSteeg

(57) ABSTRACT

The present disclosure relates to read head apparatus, and methods of forming read head apparatus, for magnetic storage devices, such as magnetic tape drives (e.g., tape drives). In one implementation, a read head for magnetic storage devices includes a lower shield, one or more upper shields, one or more lower leads, and a plurality of upper leads. The read head includes a plurality of read sensors, each read sensor of the plurality of read sensors including a first antiferromagnetic (AFM) layer. The read head includes a plurality of soft bias side shields disposed between and outwardly of the plurality of read sensors. The read head includes one or more second AFM layers disposed above the first AFM layer and the plurality of soft bias side shields along a downtrack direction.

11 Claims, 22 Drawing Sheets

(56) References Cited

U.S. PATENT DOCUMENTS

| | | |
|---|---|---|
| 5,998,048 A | 12/1999 | Jin et al. |
| 6,038,106 A | 3/2000 | Aboaf et al. |
| 6,185,077 B1 | 2/2001 | Tong et al. |
| 7,038,892 B2 | 5/2006 | Chau et al. |
| 7,199,975 B1 | 4/2007 | Pan |
| 7,986,485 B2 | 7/2011 | Mckinstry et al. |
| 8,576,518 B1 | 11/2013 | Zeltser et al. |
| 9,230,576 B1 | 1/2016 | Gill et al. |
| 9,269,383 B1 * | 2/2016 | Hattori et al. ........ G11B 5/3912 |
| 9,747,931 B1 | 8/2017 | Biskeborn et al. |
| 9,947,344 B2 | 4/2018 | Biskeborn et al. |
| 10,580,442 B2 | 3/2020 | Biskeborn et al. |
| 2003/0179509 A1 | 9/2003 | Pinarbasi |
| 2005/0195535 A1 | 9/2005 | Shi et al. |
| 2009/0086380 A1 | 4/2009 | Seagle |
| 2010/0328799 A1 * | 12/2010 | Braganca et al. ... G11B 5/3903 360/324.12 |
| 2011/0007431 A1 * | 1/2011 | Braganca et al. ... G11B 5/3903 360/324.12 |
| 2011/0069413 A1 * | 3/2011 | Maat et al. .......... G11B 5/3948 360/324 |
| 2011/0141629 A1 * | 6/2011 | Braganca et al. ... G11B 5/3903 360/313 |
| 2013/0286511 A1 * | 10/2013 | Edelman et al. .... G11B 5/3948 360/110 |
| 2014/0055884 A1 * | 2/2014 | Edelman et al. .... G11B 5/3977 360/125.04 |
| 2014/0177102 A1 * | 6/2014 | Kief et al. .......... G11B 5/3958 360/110 |
| 2014/0218823 A1 | 8/2014 | McKinlay et al. |
| 2015/0199990 A1 * | 7/2015 | Braganca et al. ... G11B 5/3948 360/315 |
| 2015/0221329 A1 * | 8/2015 | Mashima et al. .... G11B 5/3977 360/315 |
| 2015/0243301 A1 * | 8/2015 | Kief et al. .......... G11B 5/3958 360/245.8 |
| 2015/0325260 A1 * | 11/2015 | Singleton et al. ... G11B 5/3912 360/319 |
| 2017/0154641 A1 * | 6/2017 | Hao et al. ........... G11B 5/3977 |
| 2021/0158840 A1 | 5/2021 | Seagle et al. |

FOREIGN PATENT DOCUMENTS

| | | |
|---|---|---|
| JP | H07262525 A | 10/1995 |
| JP | 2002289946 A | 10/2002 |

OTHER PUBLICATIONS

Dovek, M. M. et al., "Microtrack Profiling Technique for Narrow Track Tape Heads", IEEE Transactions on Magnetics, vol. 28, No. 5, Sep. 1992, pp. 2304-2306.

Nakashio E. et al., "Flux Guide Type Tunnel-Valve Head for Tape Storage Applications", IEEE Transactions on Magnetics, vol. 38, No. 5, Sep. 2002, pp. 1925-1927.

Biskebom, Robert G. et al., "TMR tape drive for a 15 TB cartridge", AIP Publishing, Dec. 2017, https://aip.scitation.org/doi/10.1063/1.5007788, Last accessed Jun. 22, 2021.

* cited by examiner

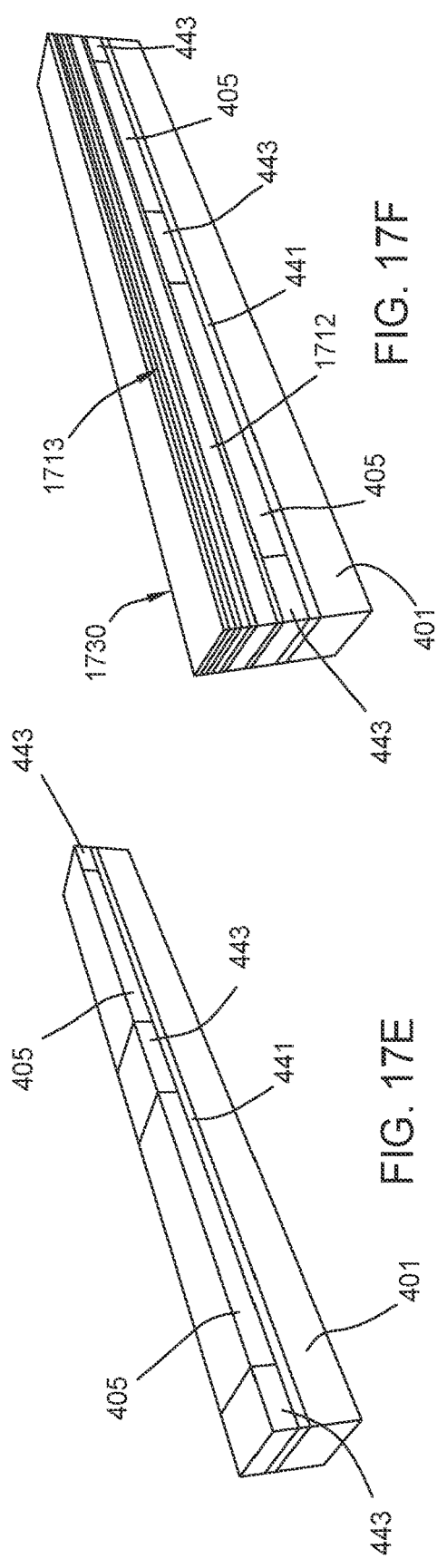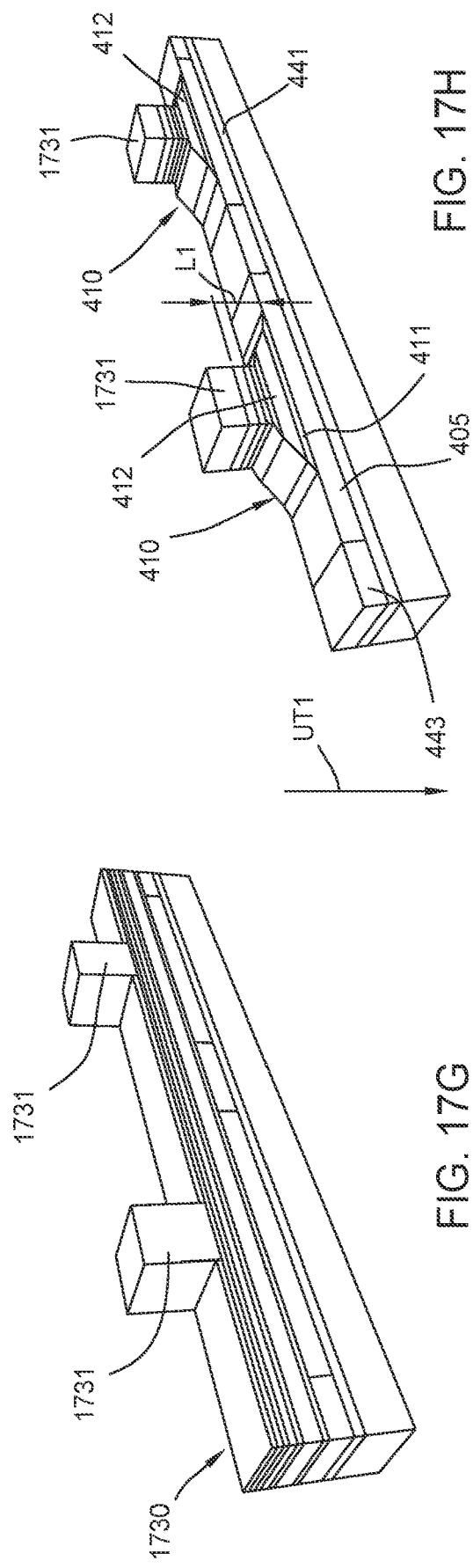

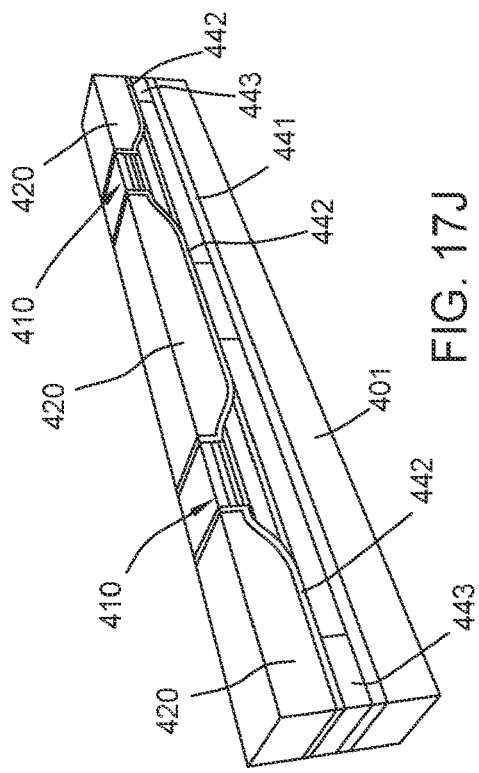
FIG. 17J
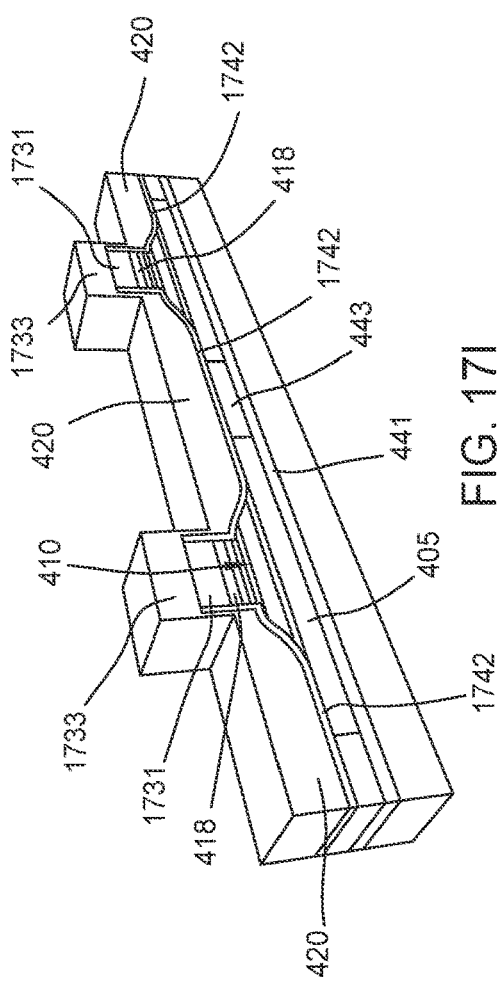
FIG. 17I
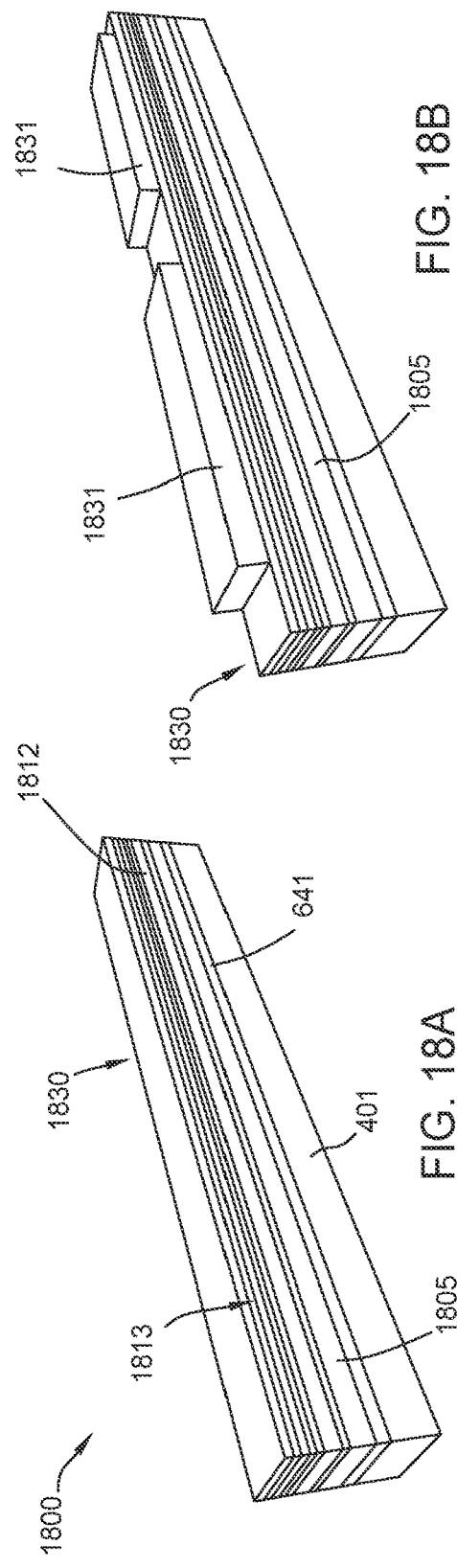
FIG. 18B
FIG. 18A

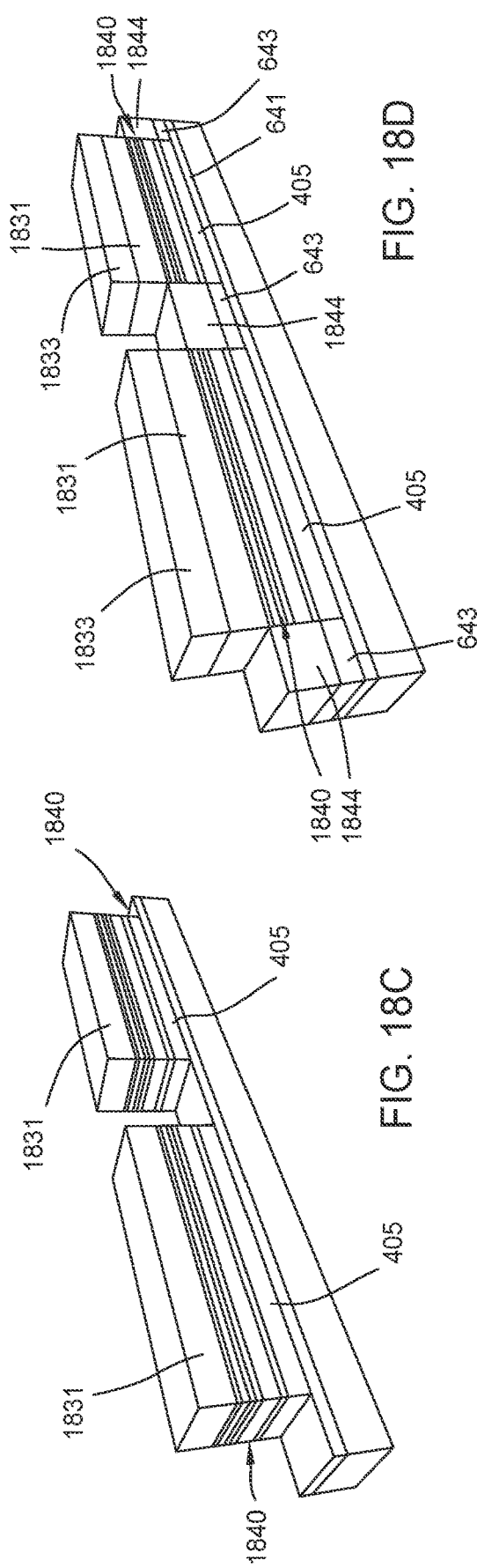
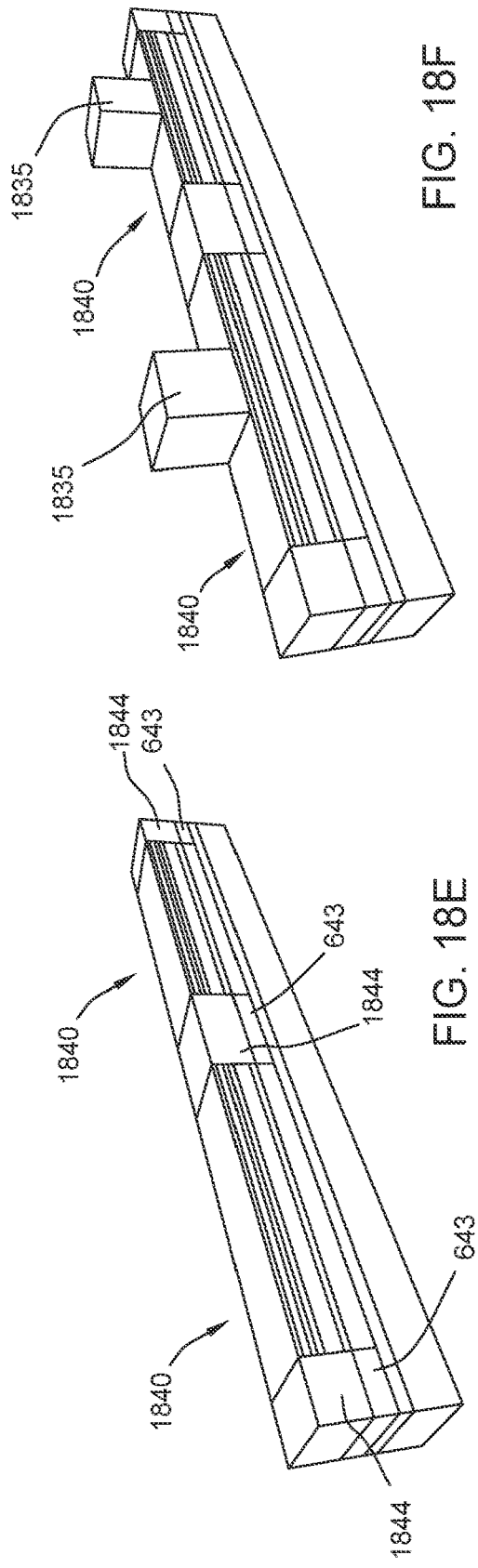

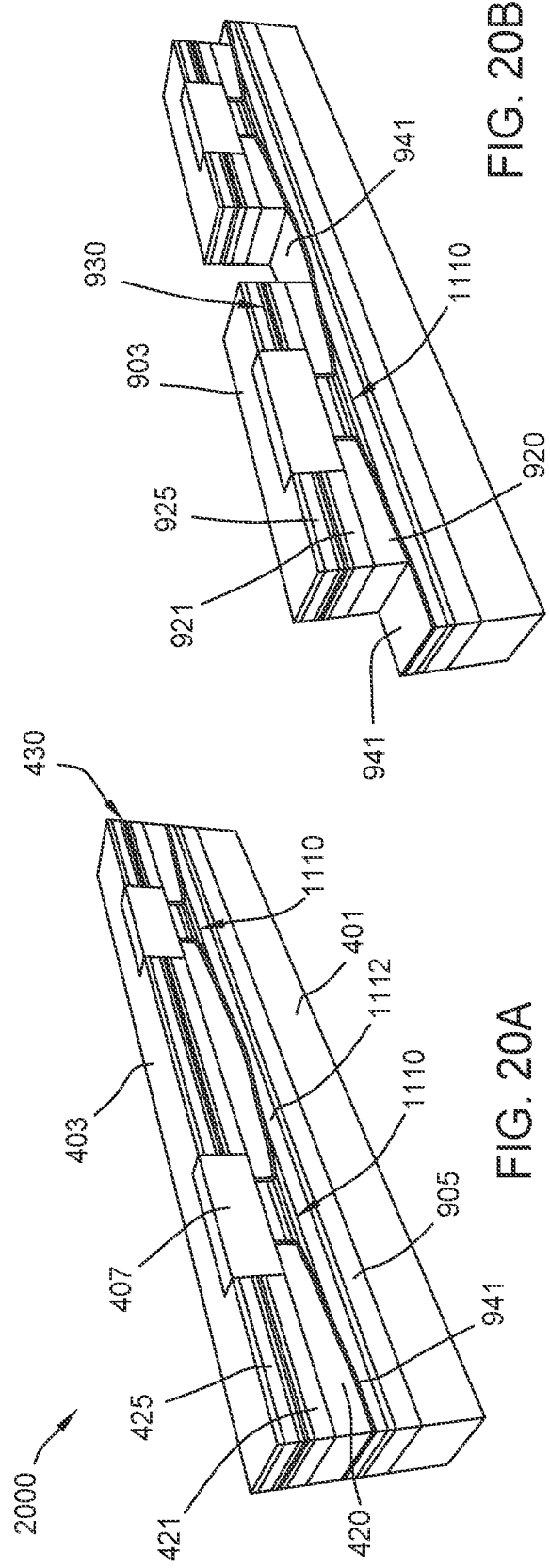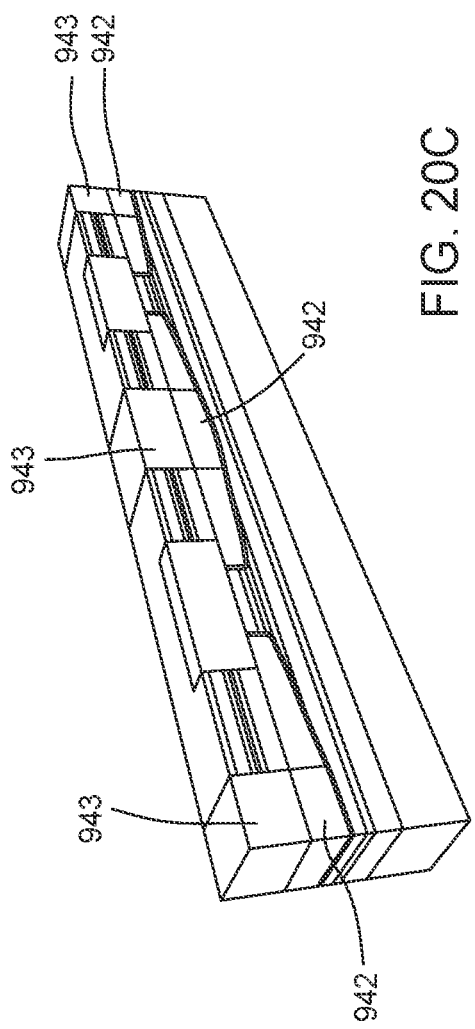

READ HEAD HAVING ONE OR MORE ANTIFERROMAGNETIC LAYERS ABOVE SOFT BIAS SIDE SHIELDS, AND RELATED METHODS

BACKGROUND OF THE DISCLOSURE

Field of the Disclosure

The present disclosure relates to read head apparatus, and methods of forming read head apparatus, for magnetic storage devices, such as magnetic tape drives.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head can have servo elements and data elements that are arranged in an array that is oftentimes referred to as a tape head array.

Hard bias elements adjacent sensors in tape drives can involve a high coercivity, which can hinder device performance. Soft bias elements involve a lower coercivity but is unstable and can even move during operation of the tape drive. Soft bias elements can also involve signal shunting, hindering device performance.

Therefore, there is a need in the art for tape drives having soft bias elements that facilitate low coercivity, stability of the soft bias elements, reduced signal shunting, and enhanced device performance.

SUMMARY OF THE DISCLOSURE

The present disclosure relates to read head apparatus, and methods of forming read head apparatus, for magnetic storage devices, such as magnetic tape drives. In one implementation, a read head for magnetic storage devices includes a lower shield, one or more upper shields, one or more lower leads, and a plurality of upper leads. The read head includes a plurality of read sensors, each read sensor of the plurality of read sensors including a first antiferromagnetic (AFM) layer. The read head includes a plurality of soft bias side shields disposed between and outwardly of the plurality of read sensors. The read head includes one or more second AFM layers disposed above the first AFM layer and the plurality of soft bias side shields in a downtrack direction.

In one implementation, a read head for magnetic storage devices includes a lower shield, an upper shield, and a plurality of lower leads disposed between the lower shield and the upper shield. The read head includes a plurality of upper leads disposed above the plurality of lower leads along a downtrack direction. The upper shield is disposed at least partially between the plurality of upper leads. Each of the plurality of upper leads and each of the plurality of lower leads is nonmagnetic and conductive. The read head includes a plurality of read sensors disposed between the plurality of lower leads and the plurality of upper leads. Each read sensor of the plurality of read sensors includes a multilayer structure. The multilayer structure includes a first antiferromagetic (AFM) layer and a free layer. The read head includes a plurality of soft bias side shields disposed between and outwardly of the plurality of read sensors, and a second AFM layer disposed between the upper shield and the plurality of soft bias side shields.

In one implementation, a read head for magnetic storage devices includes a lower shield, a plurality of upper shields, and one or more lower leads disposed between the lower shield and the one or more upper shields. The read head includes a plurality of upper leads disposed above the one or more lower leads along a downtrack direction. Each of the one or more lower leads and each of the plurality of upper leads is conductive. The read head includes a plurality of read sensors disposed between the one or more lower leads and the plurality of upper leads. Each read sensor of the plurality of read sensors includes a multilayer structure. The multilayer structure includes a first antiferromagnetic (AFM) layer a free layer. The read head includes a plurality of soft bias side shields disposed among the plurality of read sensors; and a plurality of second AFM layers disposed between the plurality of upper shields and the plurality of soft bias side shields.

In one implementation, a method of forming a read head for magnetic storage devices includes forming a lower shield, and forming a lower lead layer above the lower shield. The method includes forming a multilayer structure above the lower lead layer, the multilayer structure includes a first antiferromagetic (AFM) layer and a free layer. The method includes removing sections of the multilayer structure to form a plurality of read sensors. The method includes forming a plurality of soft bias side shields disposed between and outwardly of the plurality of read sensors, and forming a second AFM layer above the plurality of soft bias side shields. The method includes forming an upper shield above the second AFM layer, and forming one or more upper leads. The lower lead layer and each of the one or more upper leads is nonmagnetic and conductive.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 17A-17J illustrate a schematic process flow of a method of forming at least a portion of a read head, according to one implementation.

FIGS. 18A-18I illustrate a schematic process flow of a method of forming at least a portion of a read head, according to one implementation.

FIGS. 20A-20C illustrate a schematic process flow of a method of forming at least a portion of a read head, according to one implementation.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to read head apparatus, and methods of forming read head apparatus, for magnetic storage devices, such as magnetic tape drives. In one implementation, a read head for magnetic storage devices includes a lower shield, one or more upper shields, one or more lower leads, and a plurality of upper leads. The read head includes a plurality of read sensors, each read sensor of the plurality of read sensors including a first antiferromagnetic (AFM) layer. The read head includes a plurality of soft bias side shields disposed between and outwardly of the plurality of read sensors. The read head includes one or more second AFM layers disposed above the first AFM layer and the plurality of soft bias side shields along a downtrack direction.

Figure 1:
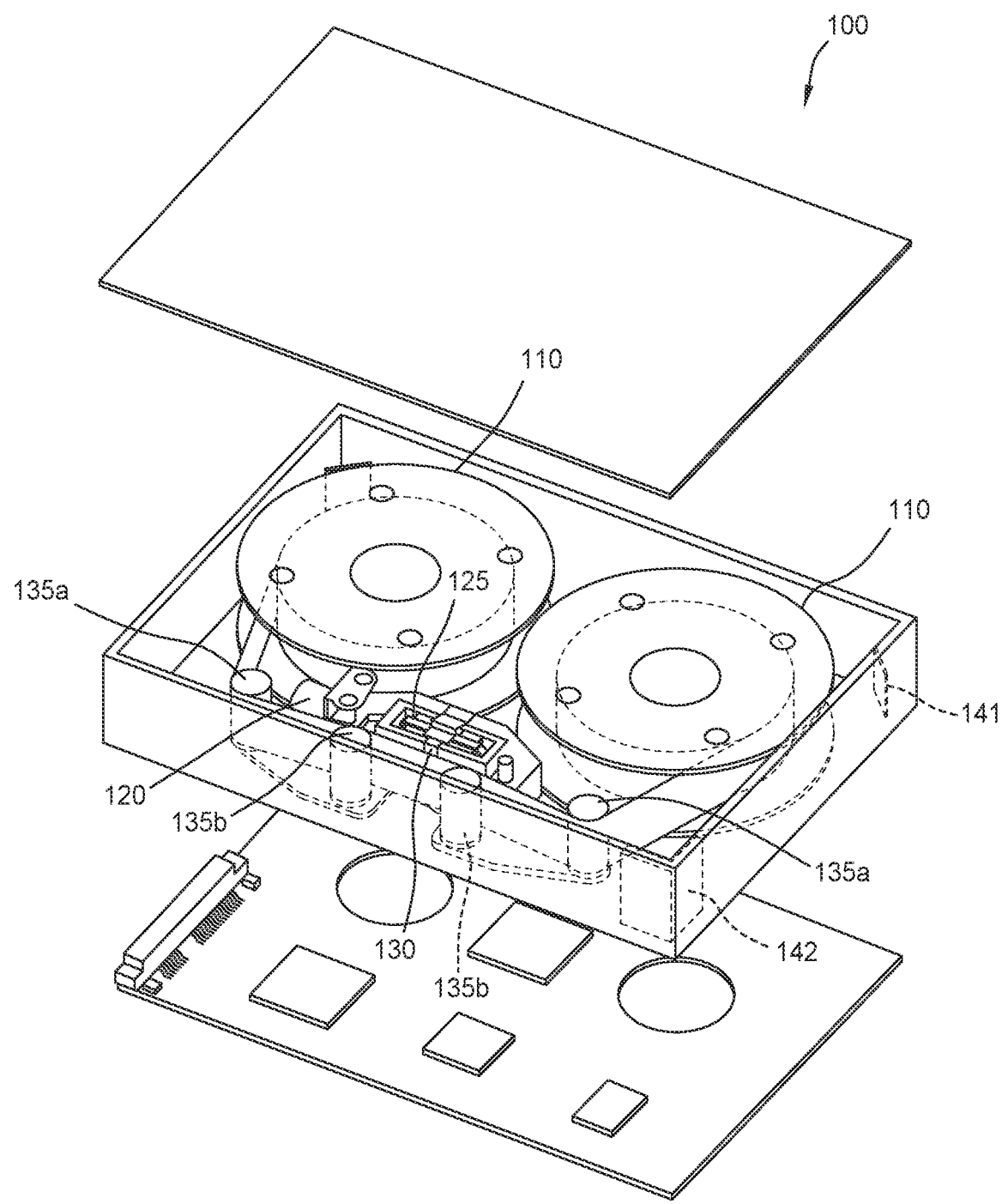
FIG. 1 is a schematic perspective exploded view of a storage device, according to one implementation.

FIG. 1 is a schematic perspective exploded view of a storage device 100, according to one implementation. The storage device 100 is a magnetic media drive. The storage device 100 will be referred to as the tape drive 100 hereafter. It is noted that while the tape drive is shown as having embedded tape for illustrative purposes, the embodiments of the invention can be applied in various forms of tape drive including a drive where the tape media is insertable such as in a media cartridge. One example is tape drives and media conforming to the LTO standard, and the various drive illustrations shown would be similar to such a drive when the media is fully inserted and engageable for data access.

Figure 2:
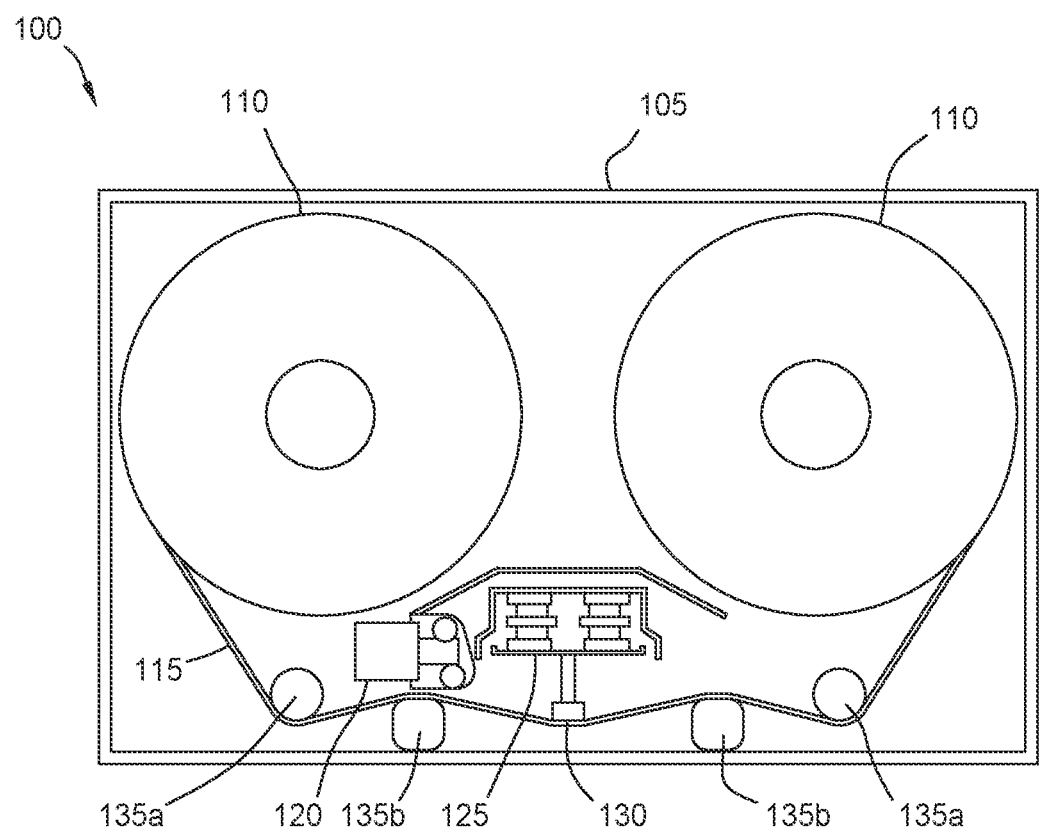
FIG. 2 is a schematic top-down view of the tape drive illustrated in FIG. 1, according to one implementation.

FIG. 2 is a schematic top-down view of the tape drive 100 illustrated in FIG. 1, according to one implementation.

Figure 3:
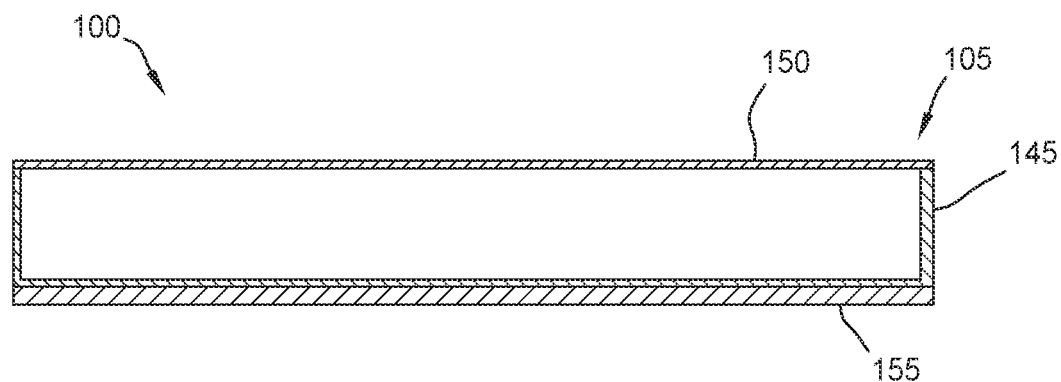
FIG. 3 is a schematic side profile view of the tape drive illustrated in FIG. 1, according to one implementation.

FIG. 3 is a schematic side profile view of the tape drive 100 illustrated in FIG. 1, according to one implementation.

Focusing on FIG. 2, for example, the tape drive 100 includes an enclosure that includes a casing 105, one or more tape reels 110, one or more rotors (e.g., a stepping motor 120 (also known as a stepper motor), a voice coil motor (VCM) 125, a head assembly 130 with one or more read heads and one or more write heads, and tape guides/rollers 135a, 135b. Focusing on FIG. 3, for example, the tape drive 100 also includes a printed circuit board assembly 155 (PCBA). In one embodiment, which can be combined with other embodiments, most of the components are within an interior cavity of the casing 105, except the PCBA 155, which is mounted on an external surface of the casing 105. The same components are illustrated in a perspective view in FIG. 1.

In the illustrated implementations, two tape reels 110 are placed in the interior cavity of the casing 105, with a center of each of the two tape reels 110 on the same level in the cavity. As shown in FIGS. 1 and 2, the head assembly 130 is located between and below the two tape reels 110. Tape reel motors located in the spindles of the tape reels 110 can operate to wind and unwind the tape media 115 into and out of the tape reels 110. Each tape reel 110 may also incorporate a tape folder to help the tape media 115 be neatly wound onto the respective tape reel 110. The tape media 115 may be made via a sputtering process to provide improved areal density. The tape media 115 includes two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

In one embodiment, which can be combined with other embodiments, the guides/rollers 135 utilize the same structure, as shown in FIG. 1. In one embodiment, which can be combined with other embodiments, the guides/rollers 135 may have more specialized shapes and differ from each other based on function, as shown in FIG. 2. A lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and the stepping motor 120 may variably position the tape head(s) transversely with respect to the width of the recording tape (e.g., the tape media 115). The stepping motor 120 may provide coarse movement, while the voice coil motor 125 may provide finer actuation of the head(s) of the head assembly 130. In one embodiment, which can be combined with other embodiments, servo data may be written to the tape media 115 to aid in more accurate position of the head(s) along the tape media 115.

The casing 105 includes one or more particle filters 141 and/or desiccants 142, as illustrated in FIG. 1, to help maintain the environment in the casing 105. For example, if the casing 105 is not airtight, the particle filters 141 may be placed where airflow is expected. The particle filters 141 and/or desiccants 142 may be placed in one or more of the corners or any other convenient place away from the moving internal components. For example, the moving tape reels 110 may generate internal airflow as the tape media 115 winds/unwinds, and the particle filters 141 may be placed within that airflow.

There is a wide variety of possible placements of the internal components of the tape drive 100 within the casing 105. In particular, as the head assembly 130 is internal to the casing 105 in certain examples, the tape media 115 may not be exposed to the outside of the casing 105. Thus, the tape media 115 does not need to be routed along the edge of the casing 105 and can be freely routed in more compact and/or otherwise more efficient ways within the casing 105. Similarly, the head(s) and tape reels 110 may be placed in a variety of locations to achieve a more efficient layout, as there are no design requirements to provide external access to these components.

As illustrated in FIG. 3, the casing 105 includes a cover 150 and a base 145. The PCBA 155 is attached to the bottom, on an external surface of the casing 105, opposite the cover 150. The base 145 includes three walls and the cover 150 includes a fourth wall to form four walls of a plurality of walls of the casing 105 that is included in the enclosure of the tape drive 100. As the PCBA 155 is made of solid state electronics, environmental issues are less of a concern, so it does not need to be placed inside the casing 105. That leaves room inside the casing 105 for other components, particularly, the moving components and the tape media 115 that would benefit from a more protected environment.

In one embodiment, which can be combined with other embodiments, the tape drive 100 is sealed. Sealing can mean the tape drive 100 is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, which can be combined with other embodiments, the cover 150 is used to hermetically seal the tape drive 100. For example, the tape drive 100 may be hermetically sealed for environmental control by attaching (e.g., laser welding, adhering using adhesive, etc.) the cover 150 to the base 145. The tape drive 100 may be filled by helium, nitrogen, hydrogen, or any other typically inert gas.

In one embodiment, which can be combined with other embodiments, other components may be added to the tape drive 100. For example, a pre-amp for the heads of the head assembly 130 may be added to the tape drive 100. The pre-amp may be located on the PCBA 155, in the head assembly 130, or in another location. In general, placing the pre-amp closer to the heads may have a greater effect on the read and write signals in terms of signal-to-noise ratio (SNR). In one embodiment, which can be combined with other embodiments, some of the components may be omitted. For example, the particle filters 141 and/or the desiccant 142 may be omitted.

Figure 4:
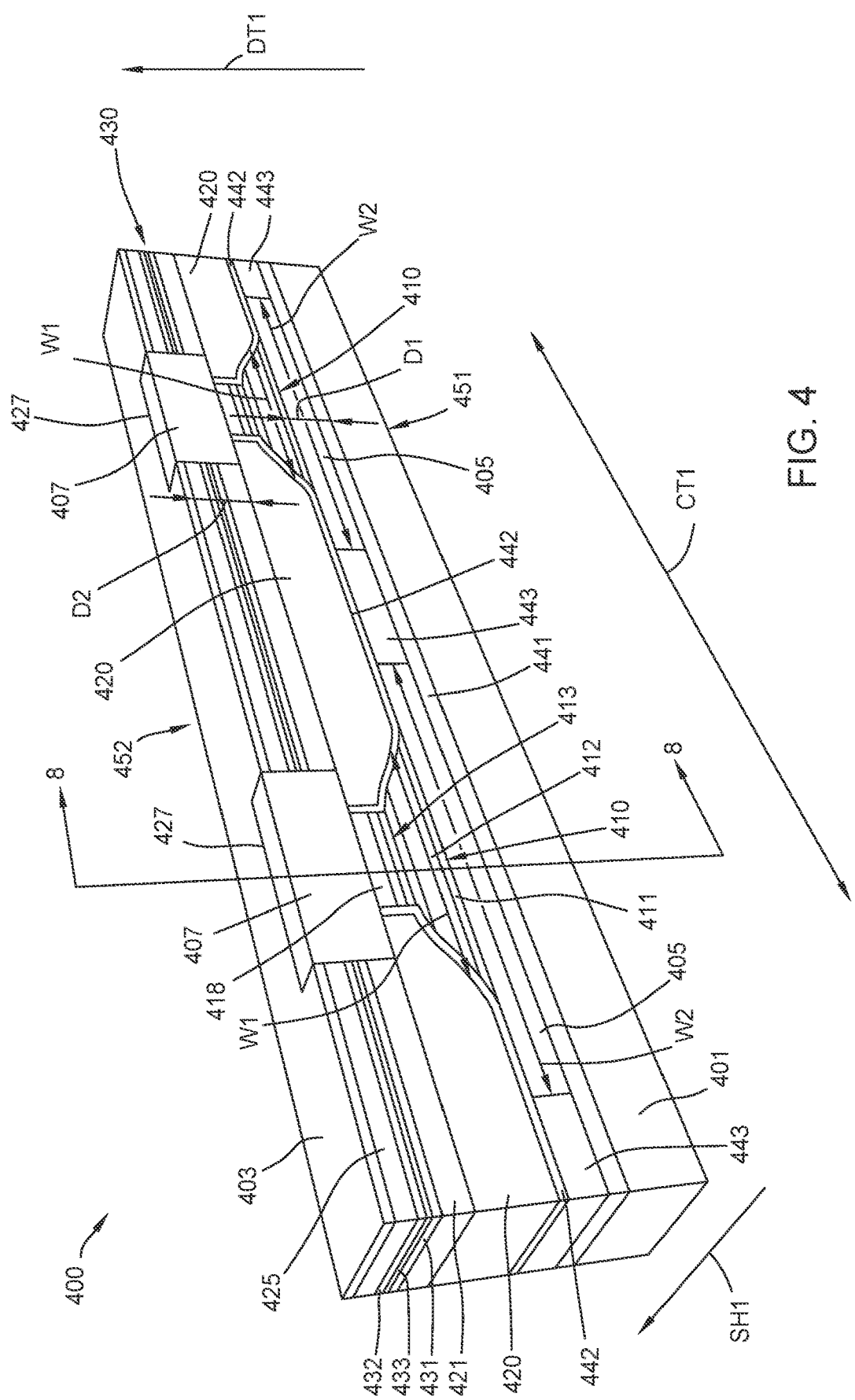
FIG. 4 is a schematic isometric media facing surface (MFS) view of a read head, according to one implementation.

FIG. 4 is a schematic isometric media facing surface (MFS) view of a read head 400, according to one implementation. The read head 400 can be used as part of the tape drive 100 (a magnetic storage device) shown in FIG. 1. The read head 400 includes a lower shield 401, an upper shield 403, and a plurality of lower leads 405 disposed between the lower shield 401 and the upper shield 403. The read head 400 includes a plurality of first upper leads 407 disposed above the plurality of lower leads 405 along a downtrack direction DT1. The upper shield 403 is disposed at least partially between the plurality of first upper leads 407. Each of the plurality of first upper leads 407 and each of the plurality of lower leads 405 is nonmagnetic and conductive.

A plurality of read sensors 410 are disposed between the plurality of lower leads 405 and the plurality of first upper leads 407. Each read sensor 410 of the plurality of read sensors 410 includes a multilayer structure. The multilayer structure of each read sensor 410 includes a buffer layer 411 disposed on a respective lower lead 405, a first antiferromagetic (AFM) layer 412 disposed on the buffer layer 411, and a free layer 413 disposed on the first AFM layer 412. Each read sensor 410 includes a cap layer 418 disposed on the free layer 413. The cap layer 418 is non-ferromagnetic. The read head 400 includes a plurality of soft bias side shields 420 disposed among the plurality of read sensors 410. The plurality of soft bias side shields 420 are disposed between and outwardly of the plurality of read sensors 410. The read head 400 includes a buffer layer 421 disposed on the plurality of soft bias side shields 420, and a second AFM 425 layer disposed between the upper shield 403 and the plurality of soft bias side shields 420. The buffer layer 411 is nonmagnetic. The second AFM layer 425 is disposed above the plurality of soft bias side shields 420 along the downtrack direction DT1. Each of the soft bias side shields 420, the buffer layer 421, and the second AFM layer 425 is magnetic and conductive. The buffer layer 411 is nonmagnetic and is formed of one or more of nickel-chromium (NiCr), ruthenium (Ru), and/or tantalum (Ta). The buffer layer 421 is formed of nickel-iron (NiFe). The soft bias side shields 420 are formed of nickel-iron (NiFe). The second AFM layer 425 pins the soft bias side shields 420 through the buffer layer 421.

Figure 5:
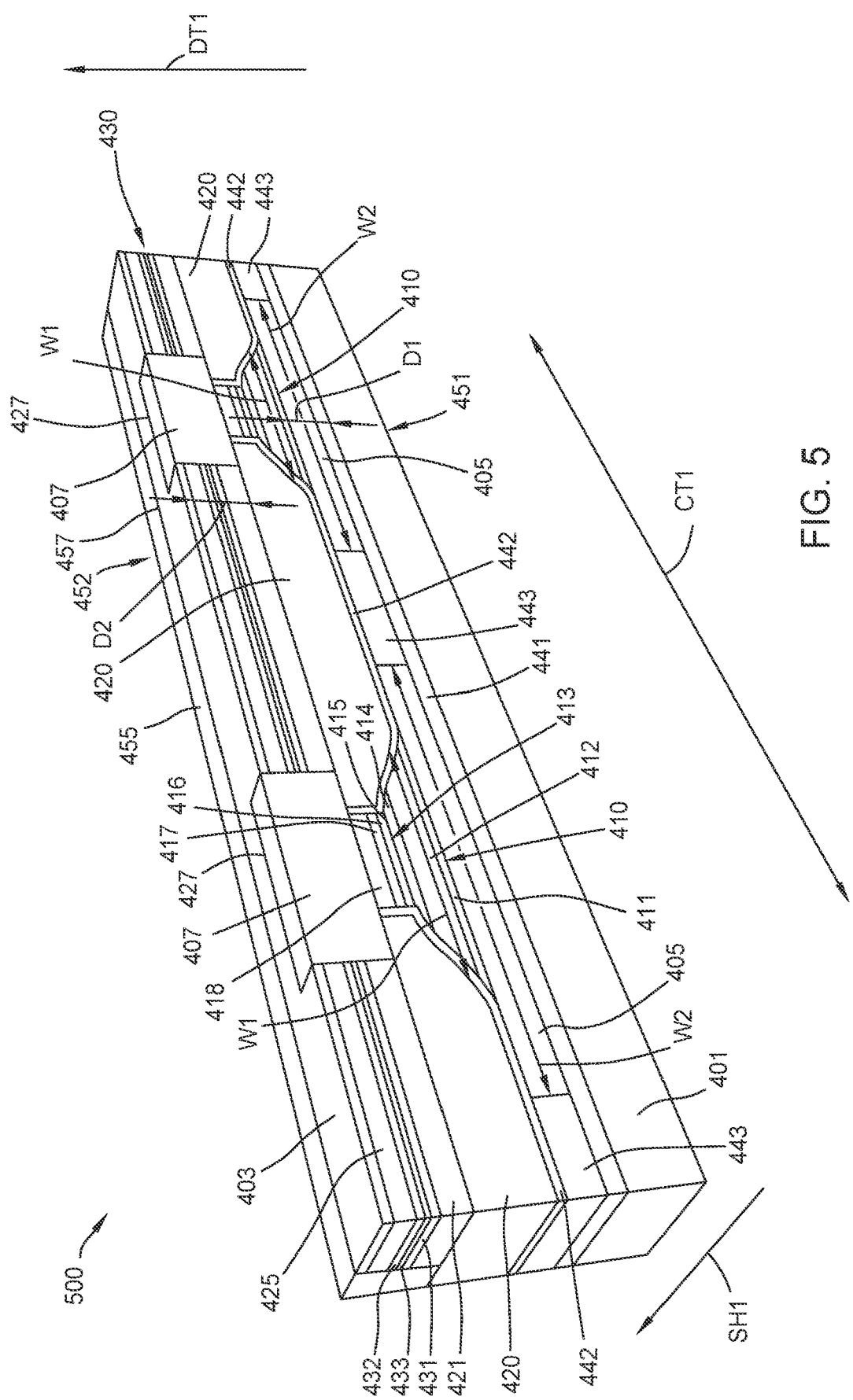
FIG. 5 is a schematic isometric media facing surface (MFS) view of a read head, according to one implementation.

The free layer 413 of each read sensor 410 includes a plurality of layers 414-417 (shown in FIG. 5). The free layer 413 is ferromagnetic. The free layer 413 includes two layers 414, 416 separated by a spacer layer 415. Each of the two layers 414, 416 is formed of one or more of cobalt (Co), iron (Fe), and/or boron (B). The spacer layer 415 is formed of magnesium oxide (MgO) and is of a length along the downtrack direction DT1 that is within a range of 5 Angstroms to 200 Angstroms, such as 20 Angstroms. A layer 417 between the layer 416 and the cap layer 418 is formed of nickel-iron (NiFe).

The soft bias side shields 420 facilitate biasing the magnetic read field of the read sensors 410 during magnetic reading operations. The soft bias side shields 420 facilitate a magnetic field in a crosstrack direction CT1 during the magnetic reading operations. The second AFM layer 425 facilitates stabilizing the soft bias side shields 420 during the magnetic reading operations. The stabilization facilitated using the second AFM layer 425 facilitates preventing movement (such as movement along a stripe height direction SH1) of the soft bias side shields 420 during the magnetic reading operations.

The second AFM layer 425 is formed of iridium manganese (IrMn). The first AFM layers 412 are formed of iridium manganese (IrMn). The read head 400 includes a trilayer structure 430 disposed between the second AFM layer 425 and the plurality of soft bias side shields 420. The trilayer structure 430 includes two layers 431, 432 separated by a spacer layer 433. The two layers 431, 432 are each formed of one or more of cobalt (Co), iron (Fe), and/or boron (B). The spacer layer 433 is formed of magnesium oxide (MgO) and is of a length along the downtrack direction DT1 that is within a range of 5 Angstroms to 200 Angstroms, such as 20 Angstroms.

The second AFM layer 425 has a rectangular cross section in a plane defined by the crosstrack direction CT1 and the downtrack direction DT1. A profile of a bottom surface of the second AFM layer 425 is parallel to a profile of an upper surface of the first AFM layer 412 of each read sensor 410.

The buffer layer 411 of each read sensor 410 is disposed at a first distance D1 relative to the lower shield 401. The cap layer 418 of each read sensor 410 is disposed at a second distance D2 relative to the upper shield 403. The second distance D2 is substantially equal to the first distance D1 such that a difference between the second distance D2 and the first distance D1 can be 1 nm or less. Depending on the configuration the difference between the second distance D2 and the first distance D1 may be different. In one embodiment which can be combined with other embodiments, a difference between the second distance D2 and the first distance D1 is 50 nm or less. The second distance D2 being substantially equal to the first distance D1 facilitates stabilizing the read sensors 410 and enhancing magnetic reading operations. Each first upper lead 407 is disposed in a plurality of first recesses 427 formed in the upper shield 403, the two layers 431, 432, the spacer layer 433, and the second AFM layer 425. The first upper lead 407 facilitates reduced signal shunting, such as any signal shunting that may be facilitated by the second AFM layers 425.

The read head 400 includes a first insulation layer 441 disposed between the plurality of lower leads 405 and the lower shield 401, a plurality of second insulation layers 442 disposed between the plurality of lower leads 405 and the plurality of soft bias side shields 420, and a plurality of third insulation layers 443 disposed between and outwardly of the plurality of lower leads 405. The second insulation layers 442 are disposed between and outwardly of the read sensors 410. The first AFM layer 412 of each read sensor 410 is of a first width W1 along the crosstrack direction CT1, and each lower lead 405 is of a second width W2 that is greater than the first width W1. The first width W1 of each first AFM layer 412 is taken along a lower side (lower along the downtrack direction DT1) of the respective first AFM layer 412. The first upper leads 407, using the upper shield 403, function as a common lead that spans the plurality of read sensors 410. The lower leads 405, using the insulation layers 441, 442, 443, function as separate leads for the plurality of read sensors 410. The first insulation layer 441 is of a thickness (along the downtrack direction DT1) that is 3 nm or more.

FIG. 5 is a schematic isometric media facing surface (MFS) view of a read head 500, according to one implementation. The read head 500 is similar to the read head 400 shown in FIG. 4, and includes one or more of the aspects, features, components, and/or properties thereof. The first upper leads 407 are a plurality of first upper leads disposed on a first stripe side 451 of the read head 500. The read head 500 includes a second upper lead 455 on a second stripe side 452 of the read head 500. The first stripe side 451 and the second stripe side 452 oppose each other along the stripe height direction SH1. The first stripe side 451 is a media facing surface (MFS) such as an air bearing surface (ABS).

The second upper lead 455 is disposed in a recess 457 formed in the upper shield 403, the two layers 431, 432, the spacer layer 433, and the second AFM layer 425. The first upper leads 407 and the second upper lead 455, using the upper shield 403, function as a common lead that spans the plurality of read sensors 410. The lower leads 405, using the insulation layers 441, 442, 443, function as separate leads for the plurality of read sensors 410. The second upper lead 455 facilitates shape anisotropy for the second AFM layer 425 to facilitate magnetic reading performance.

Figure 6:
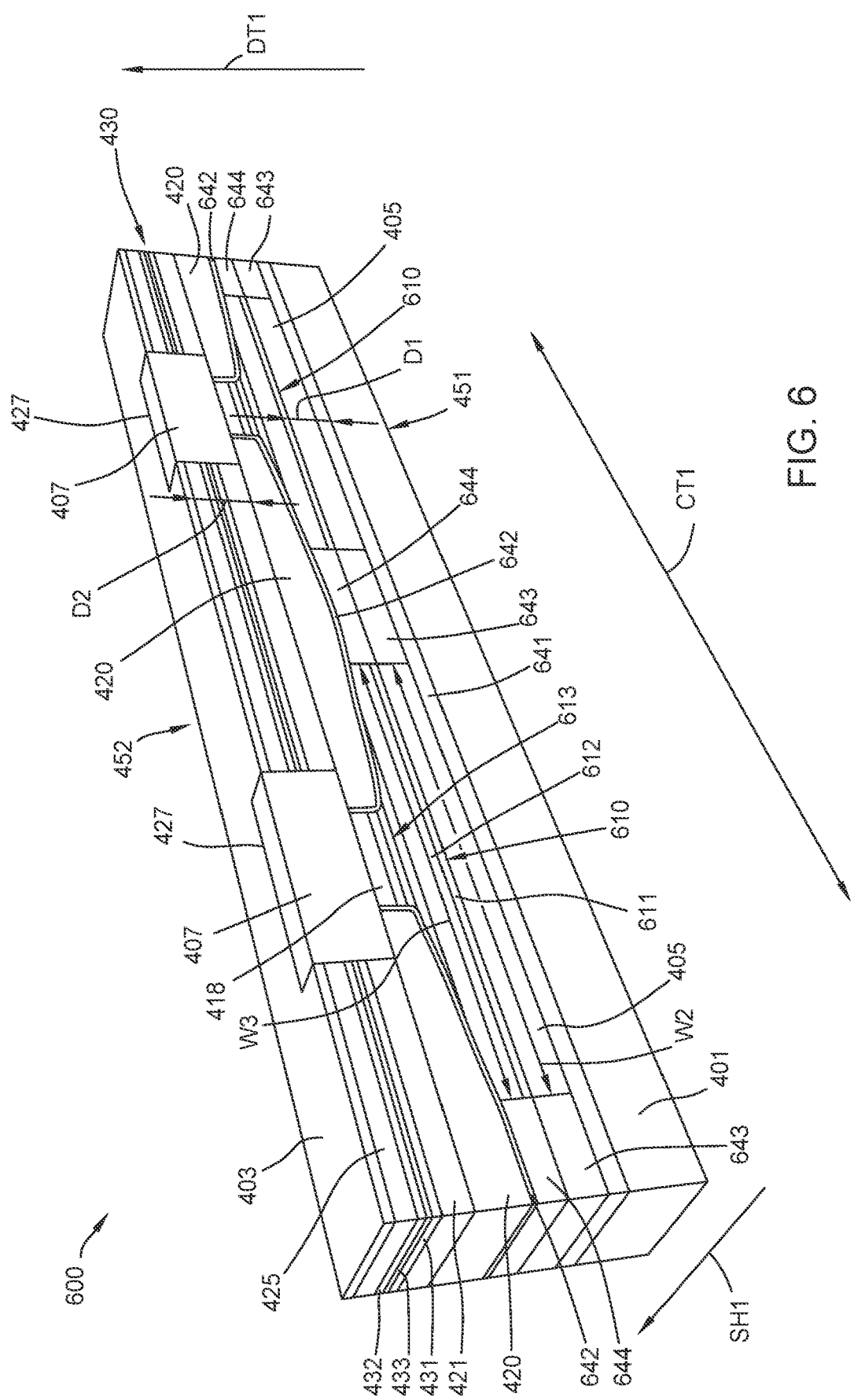
FIG. 6 is a schematic isometric media facing surface (MFS) view of a read head, according to one implementation.

FIG. 6 is a schematic isometric media facing surface (MFS) view of a read head 600, according to one implementation. The read head 600 is similar to the read head 400 shown in FIG. 4, and includes one or more of the aspects, features, components, and/or properties thereof. The read head 600 includes a plurality of read sensors 610 that are similar to the read sensors 410 shown in FIG. 4, and includes one or more of the aspects, features, components, and/or properties thereof. Each read sensor 610 includes a buffer layer 611, a first AFM layer 612, and a free layer 613. In the implementation shown in FIG. 4, more of the buffer layers 411, the first AFM layers 412, and the free layers 413 are milled along the crosstrack direction CT1 than the buffer layers 611, the first AFM layers 612, and the free layers 613 of the implementation shown in FIG. 6.

The read head 600 includes a first insulation layer 641 disposed between the plurality of lower leads 405 and the lower shield 401, a plurality of second insulation layers 642 disposed between the first AFM layers 612 of the read sensors 610 and the plurality of soft bias side shields 420. The read head 600 includes a plurality of third insulation layers 643 disposed between and outwardly of the plurality of lower leads 405, and a plurality of fourth insulation layers 644 disposed between and outwardly of the first AFM layers 612 and the buffer layers 611. The first AFM layer 612 and the buffer layer 611 of each read sensor 610 is of a first width W3 along the crosstrack direction CT1, and the first width W3 is substantially equal to, or (depending on the configuration) different than the second width W2 of each lower lead 405 of the plurality of lower leads 405. In one embodiment, which can be combined with other embodiments, the first width W3 is substantially equal to the second width W2 such that a difference between the second width W2 and the first width W3 is 1 nm or less.

Figure 7:
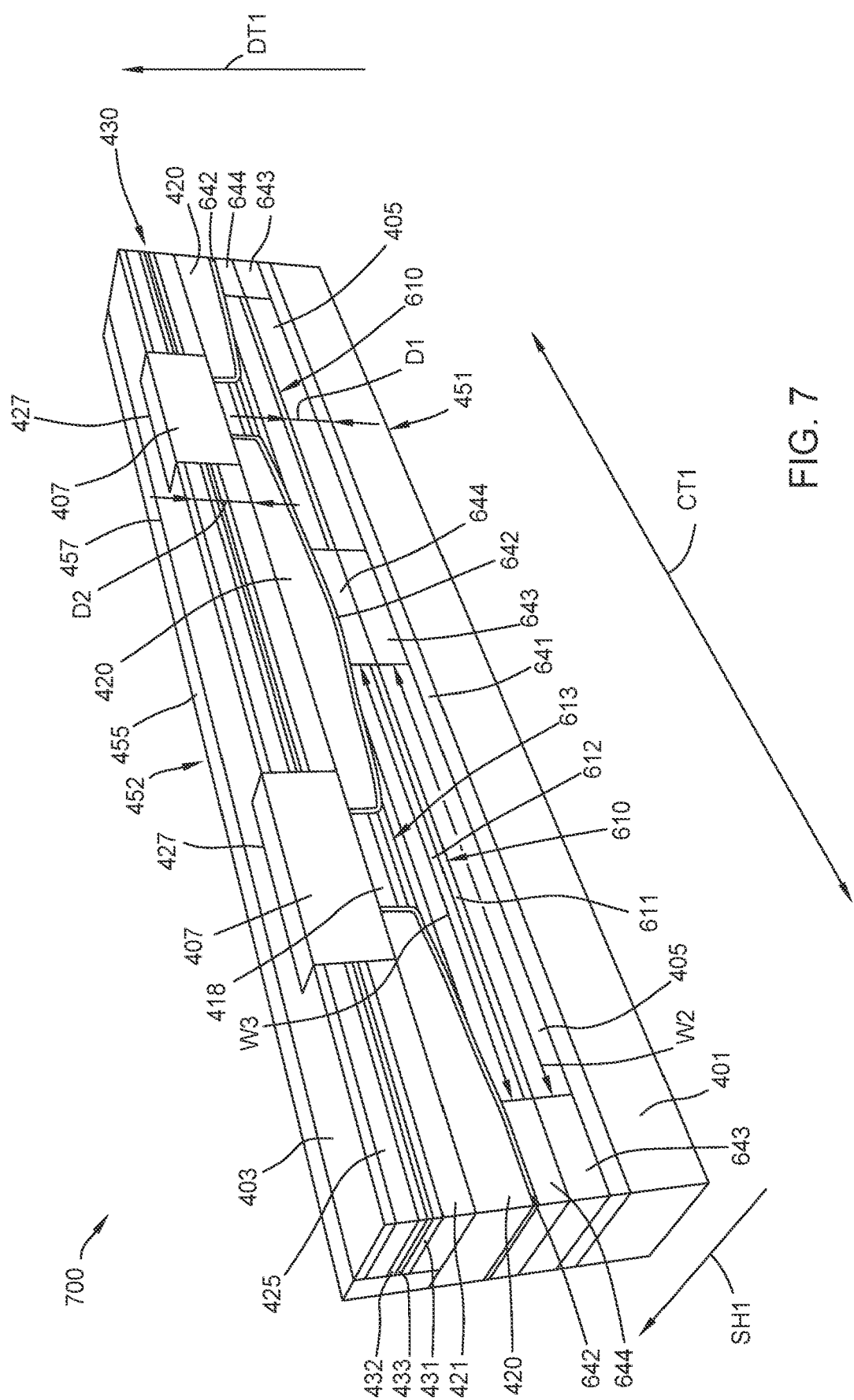
FIG. 7 is a schematic isometric media facing surface (MFS) view of a read head, according to one implementation.

FIG. 7 is a schematic isometric media facing surface (MFS) view of a read head 700, according to one implementation. The read head 700 is similar to the read head 500 shown in FIG. 5, and includes one or more of the aspects, features, components, and/or properties thereof. The read head 700 is similar to the read head 600 shown in FIG. 6, and includes one or more of the aspects, features, components, and/or properties thereof. As an example, the read head 700 combines the configurations of the read sensors 610 and the insulation layers 641-644 with the configuration of the second upper lead 455.

Figure 8:
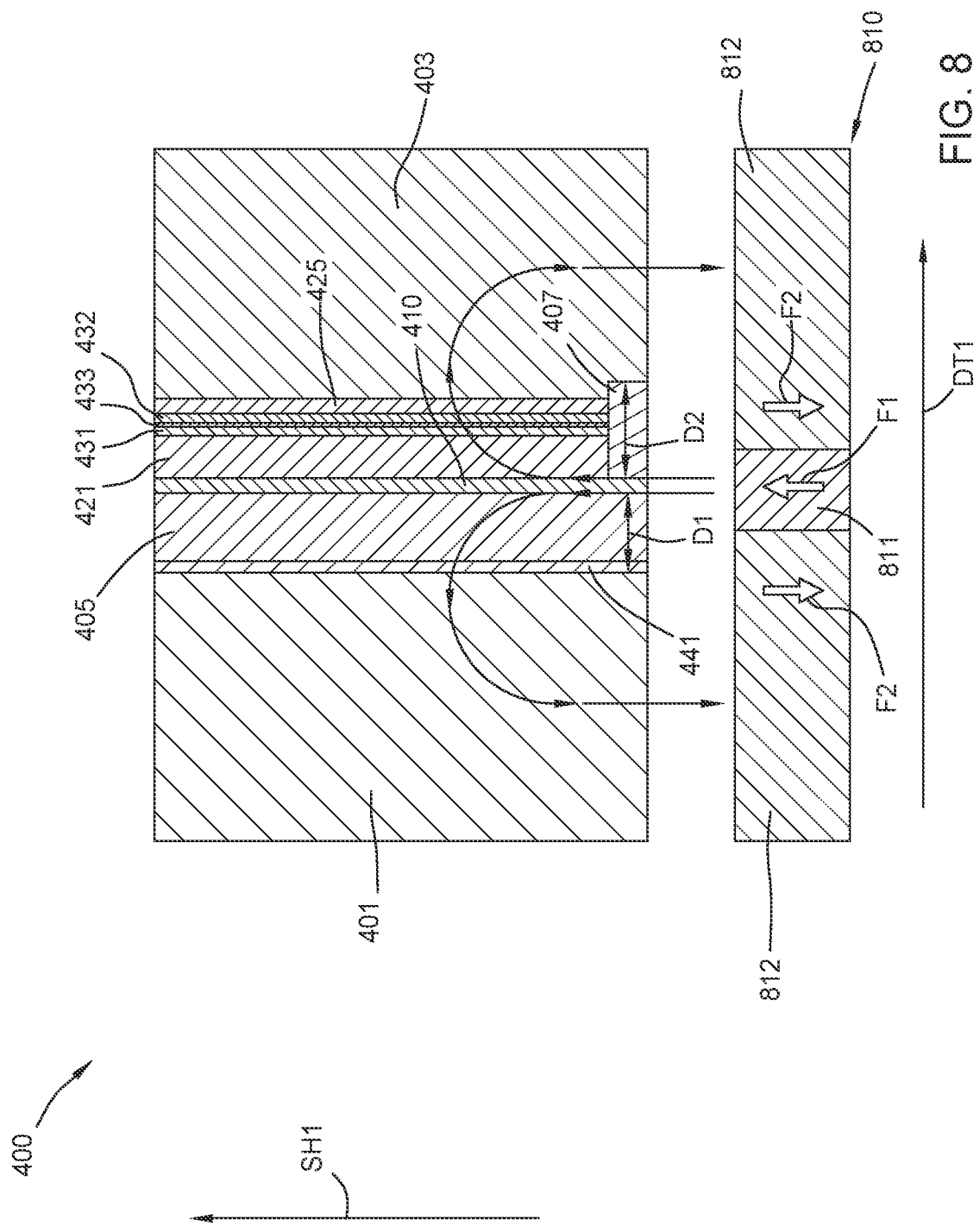
FIG. 8 is a schematic cross-sectional view, along Section 8-8, of the read head shown in FIG. 4, according to one implementation.

FIG. 8 is a schematic cross-sectional view, along Section 8-8, of the read head 400 shown in FIG. 4, according to one implementation.

During magnetic reading operations, a tape media 810 moves past the read sensors 410 in the downtrack direction DT1. A portion 811 of the tape media 810 aligned with the read sensor 410 along the stripe height direction SH1 undergoes a first magnetic force F1. Portions 812 of the tape media 810 aligned outside of the read sensor 410 along the stripe height direction SH1 undergoes second magnetic forces F2 that have the opposite or the same directions as the first magnetic force F1.

Figure 9:
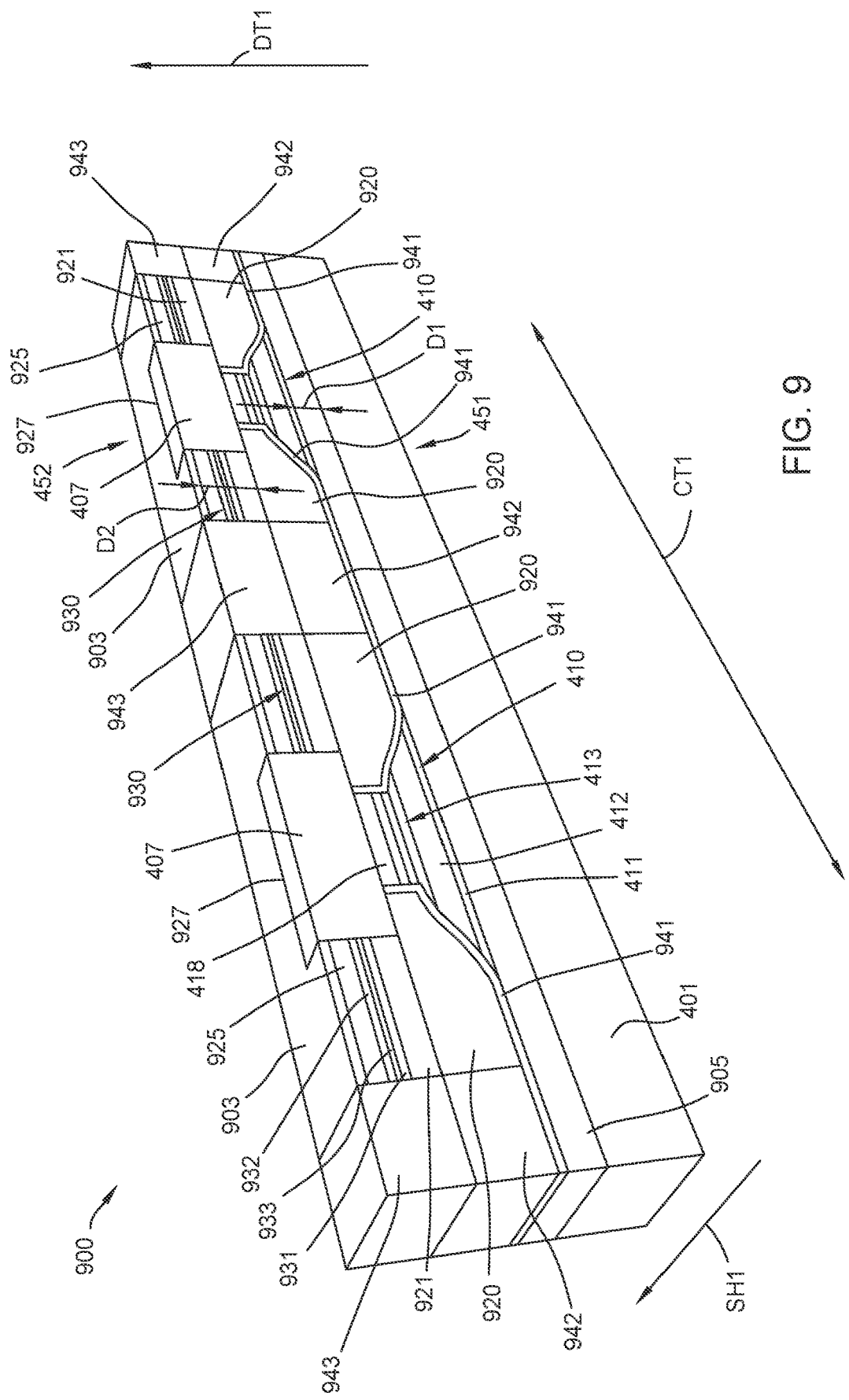
FIG. 9 is a schematic isometric media facing surface (MFS) view of a read head, according to one implementation.

FIG. 9 is a schematic isometric media facing surface (MFS) view of a read head 900, according to one implementation. The read head 900 is similar to the read head 400 shown in FIG. 4, and includes one or more of the aspects, features, components, and/or properties thereof. The read head 900 includes a plurality of upper shields 903, one or more lower leads 905 disposed between the lower shield 401 and the plurality of upper shields 903, and the plurality of first upper leads 407 disposed above the one or more lower leads 905 along the downtrack direction DT1.

The read head 900 includes a plurality of soft bias side shields 920 disposed between and outwardly of the plurality of read sensors 410, and a plurality of second AFM layers 925 disposed between the plurality of upper shields 903 and the plurality of soft bias side shields 920. The read head 900 includes a plurality of buffer layers 921 disposed between the soft bias side shields 920 and the upper shields 903. In the implementation shown in FIG. 9, the one or more lower leads 905 include a common lower lead 905 spanning the plurality of read sensors 410. The read head 900 includes a plurality of trilayer structures 930 disposed on the buffer layers 921. Each trilayer structure 930 includes two layers 931, 932 separated by a spacer layer 933.

A plurality of first insulation layers 941 are disposed between the common lower lead 905 and the plurality of soft bias side shields 920, a plurality of second insulation layers 942 are disposed between and outwardly of the plurality of soft bias side shields 920, and a plurality of third insulation layers 943 are disposed between and outwardly of the plurality of second AFM layers 925. The plurality of third insulation layers 943 are disposed between and outwardly of the plurality of first upper leads 407. The first upper leads 407 are disposed in respective recesses 927 formed in the respective buffer layers 921, trilayer structures 930, second AFM layers 925, and upper shields 903. The first upper leads 407 and the upper shields 903, using the insulation layers 941-943, function as separate leads for the read sensors 410.

Figure 10:
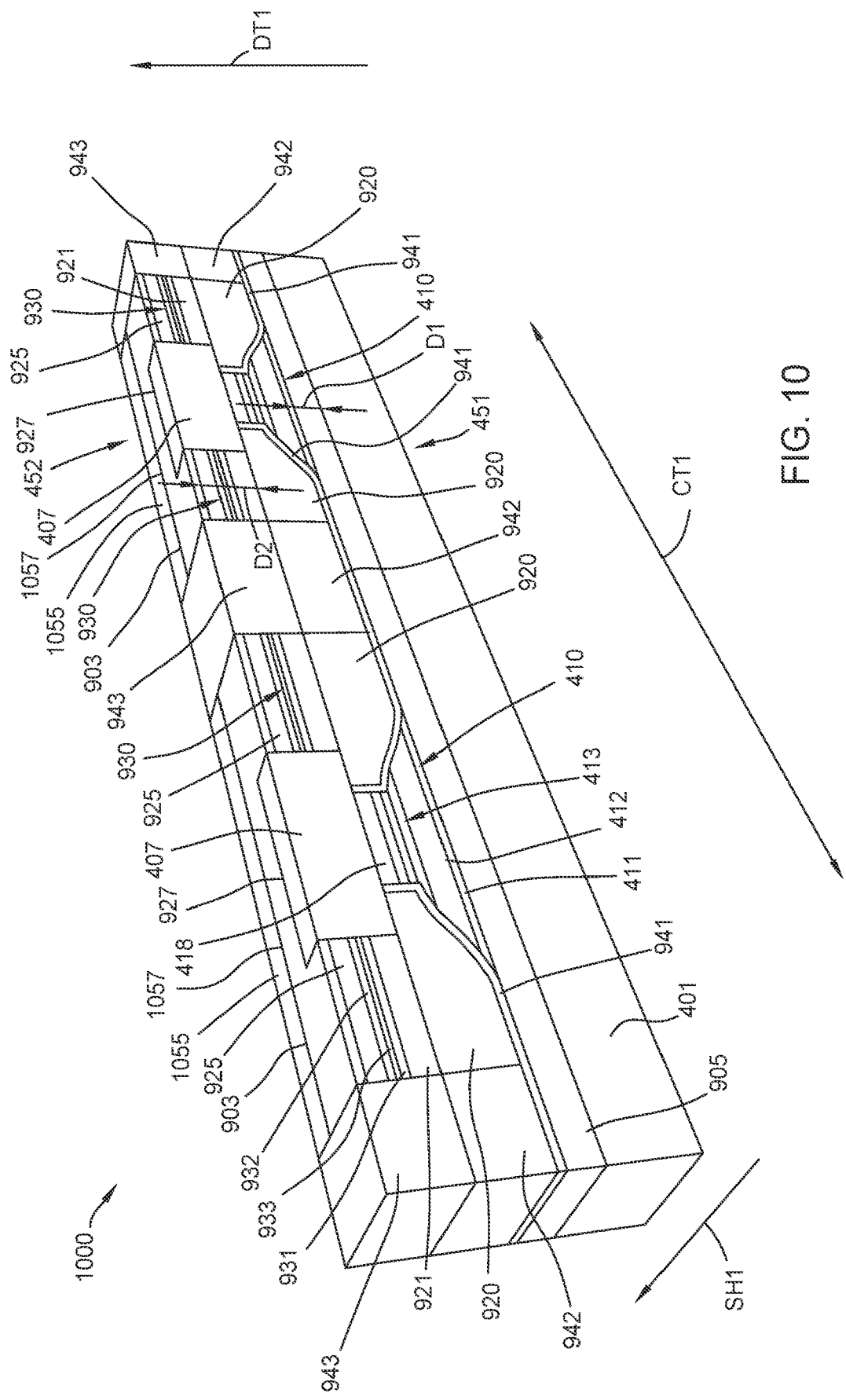
FIG. 10 is a schematic isometric media facing surface (MFS) view of a read head, according to one implementation.

FIG. 10 is a schematic isometric media facing surface (MFS) view of a read head 1000, according to one implementation. The read head 1000 is similar to the read head 900 shown in FIG. 9, and includes one or more of the aspects, features, components, and/or properties thereof. The read head 1000 includes a plurality of second upper leads 1055 on the second stripe side 452 of the read head 1000. The second upper leads 1055 are disposed in second recesses 1057 formed in the upper shields 903, the trilayer structures 930, and the second AFM layers 925.

Figure 11:
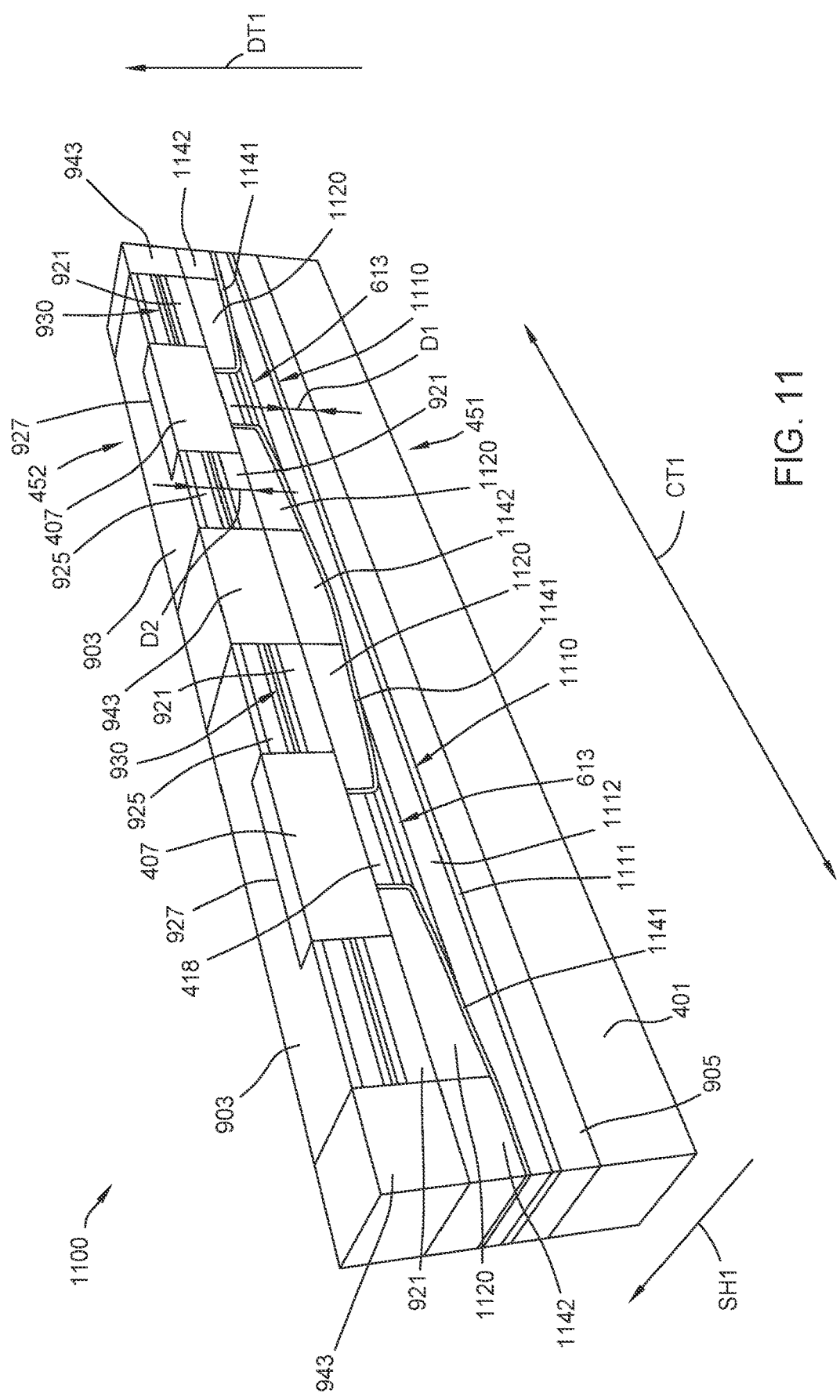
FIG. 11 is a schematic isometric media facing surface (MFS) view of a read head, according to one implementation.

FIG. 11 is a schematic isometric media facing surface (MFS) view of a read head 1100, according to one implementation. The read head 1100 is similar to the read head 900 shown in FIG. 9, and includes one or more of the aspects, features, components, and/or properties thereof. The read head 1100 is similar to the read head 600 shown in FIG. 6, and includes one or more of the aspects, features, components, and/or properties thereof. As an example, the read head 1100 combines the configurations of the free layers 613 with the configurations of the trilayer structures 930 and the third insulation layers 943. The read head 1100 includes a plurality of read sensors 1110. A first AFM layer of each read sensor 1110 is a part of a common AFM layer 1112 spanning the plurality of read sensors 1110. A buffer layer of each read sensor 1110 is a part of a common buffer layer 1111 spanning the plurality of read sensors 1110. The read head 1100 includes a plurality of soft bias side shields 1120, a plurality of first insulation layers 1141, a plurality of second insulation layers 1142, and the third plurality of insulation layers 943.

Figure 12:
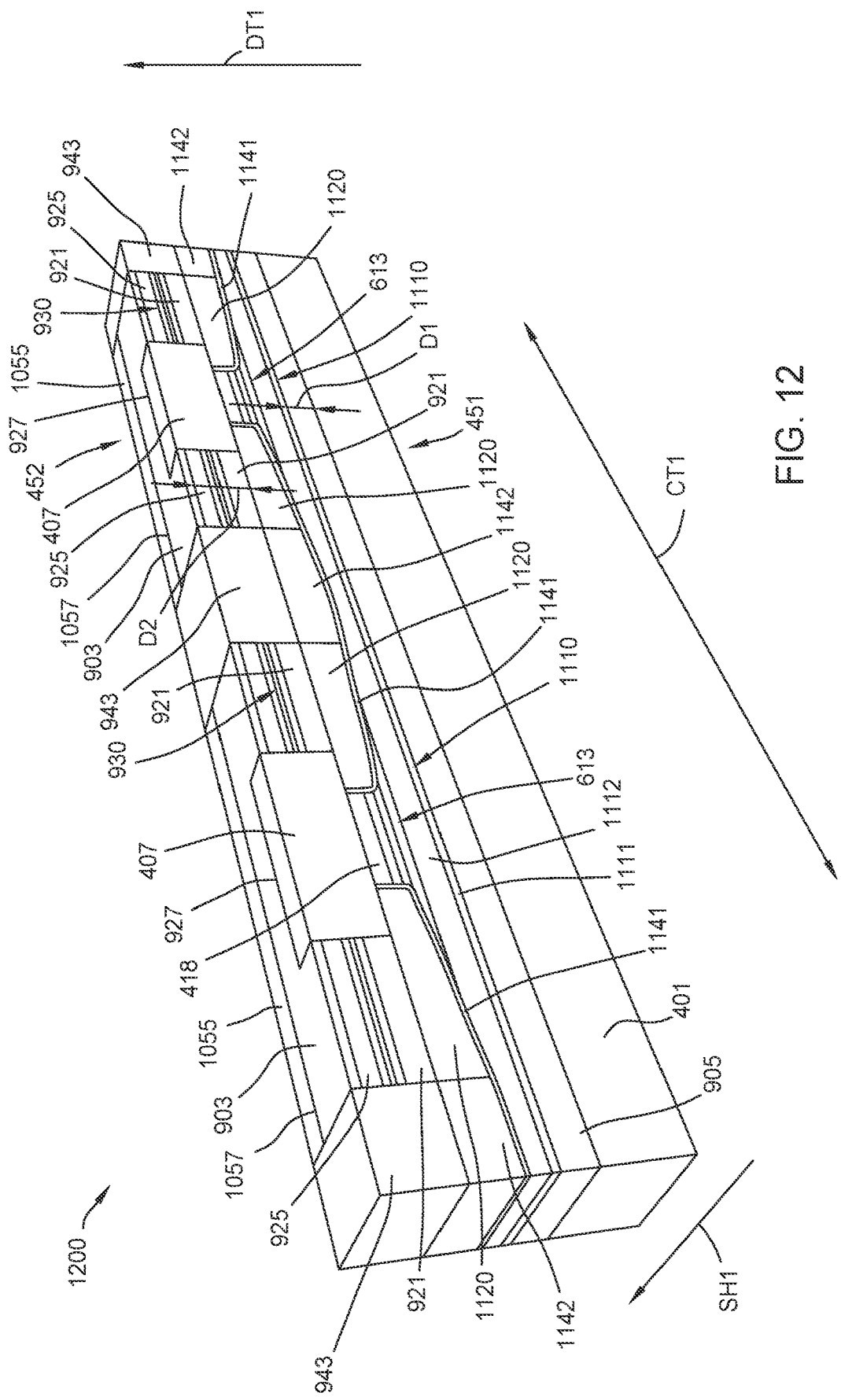
FIG. 12 is a schematic isometric media facing surface (MFS) view of a read head, according to one implementation.

FIG. 12 is a schematic isometric media facing surface (MFS) view of a read head 1200, according to one implementation. The read head 1200 is similar to the read head 1100 shown in FIG. 11, and includes one or more of the aspects, features, components, and/or properties thereof. The read head 1200 is similar to the read head 1000 shown in FIG. 10, and includes one or more of the aspects, features, components, and/or properties thereof. The read head 1200 is similar to the read head 1100 shown in FIG. 11, and includes one or more of the aspects, features, components, and/or properties thereof. As an example, the read head 1200 combines the configurations of the second upper leads 1055 with the configurations of the read sensors 1110.

Figure 13:
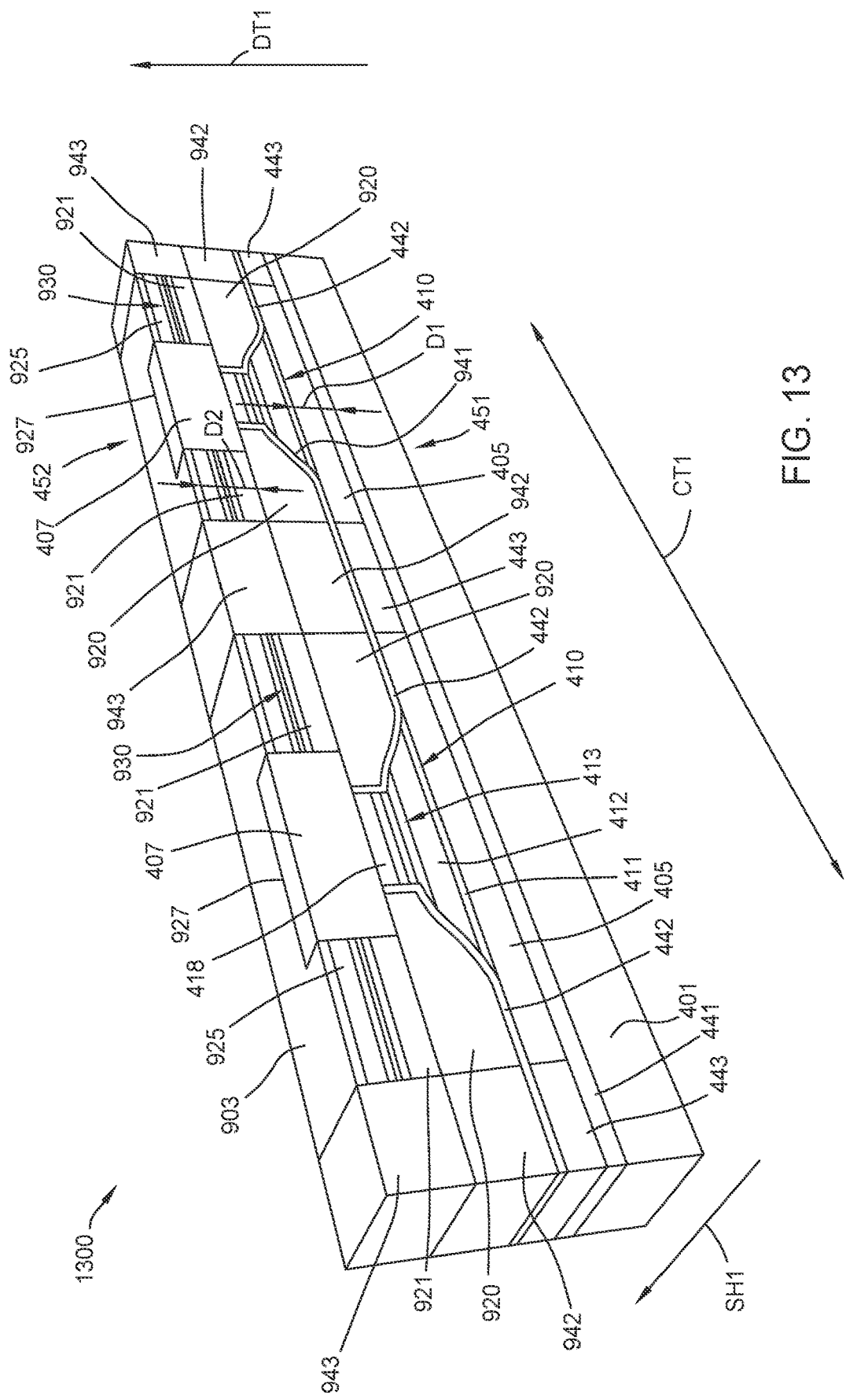
FIG. 13 is a schematic isometric media facing surface (MFS) view of a read head, according to one implementation.

FIG. 13 is a schematic isometric media facing surface (MFS) view of a read head 1300, according to one implementation. The read head 1300 is similar to the read head 400 shown in FIG. 4, and includes one or more of the aspects, features, components, and/or properties thereof. The read head 1300 is similar to the read head 900 shown in FIG. 9, and includes one or more of the aspects, features, components, and/or properties thereof. As an example, the read head 1300 combines the configurations of the read sensors 410 and the first and second insulation layers 441, 442 with the configurations of the insulation layers 942, 943. In the implementation shown in FIG. 13, the one or more lower leads includes the plurality of lower leads 405.

In the implementation shown in FIG. 13, the first insulation layer 441 is disposed between the plurality of lower leads 405 and the lower shield 401, the plurality of second insulation layers 442 are disposed between the plurality of lower leads 405 and the plurality of soft bias side shields 920, the insulation layers 942 (a plurality of third insulation layers in the implementation of FIG. 13) are disposed between and outwardly of the plurality of soft bias side shields 920, and the insulation layers 943 (a plurality of fourth insulation layers in the implementation of FIG. 13) are disposed between and outwardly of the plurality of second AFM layers 925. The insulation layers 443 are a plurality of fifth insulation layers in the implementation shown in FIG. 13.

Figure 14:
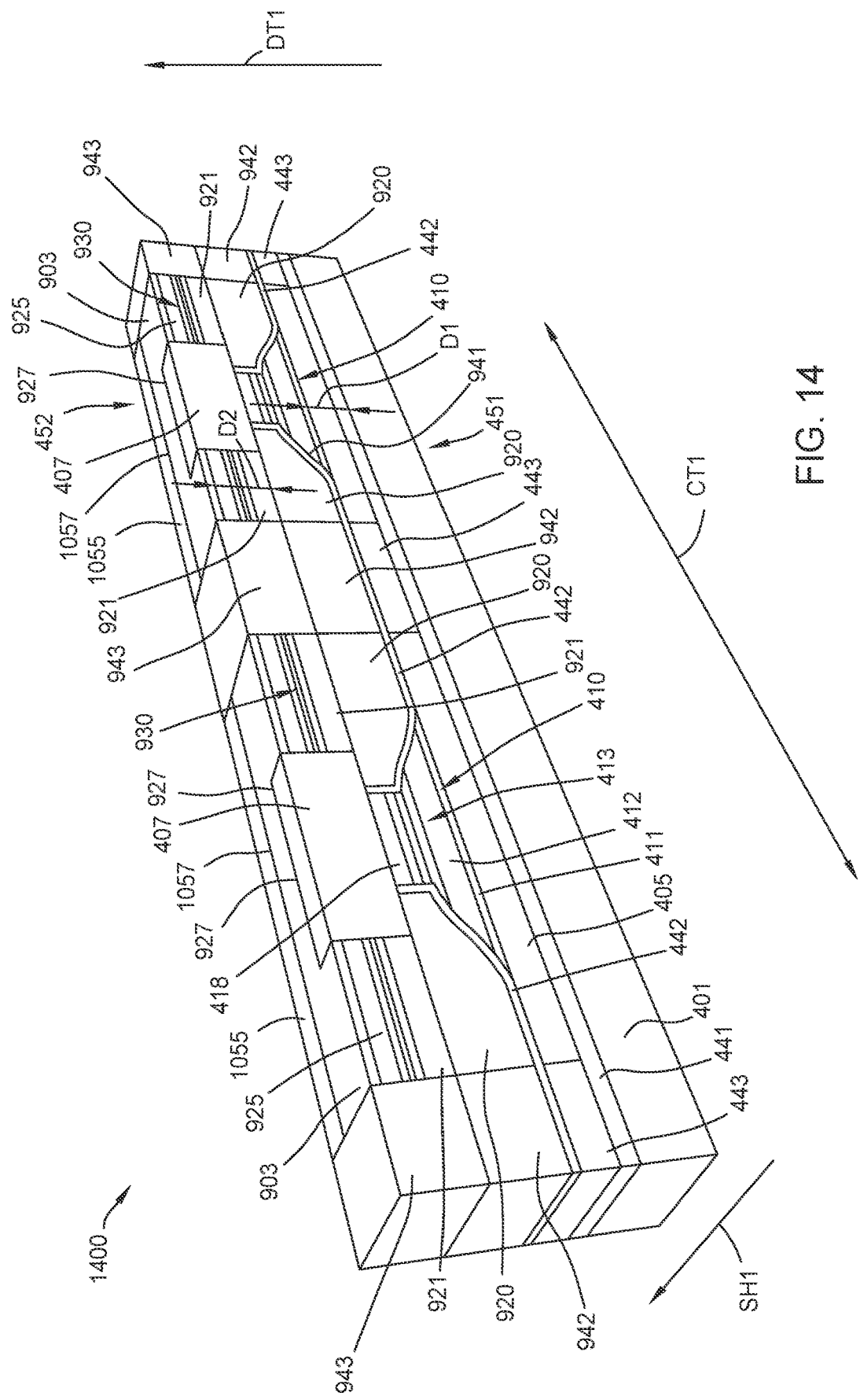
FIG. 14 is a schematic isometric media facing surface (MFS) view of a read head, according to one implementation.

FIG. 14 is a schematic isometric media facing surface (MFS) view of a read head 1400, according to one implementation. The read head 1400 is similar to the read head 1300 shown in FIG. 13, and includes one or more of the aspects, features, components, and/or properties thereof. The read head 1400 is similar to the read head 1000 shown in FIG. 10, and includes one or more of the aspects, features, components, and/or properties thereof. As an example, the read head 1400 combines the configurations of the read sensors 410 and the first and second insulation layers 441, 442 with the configurations of the insulation layers 942, 943 and the configurations of the second upper leads 1055.

Figure 15:
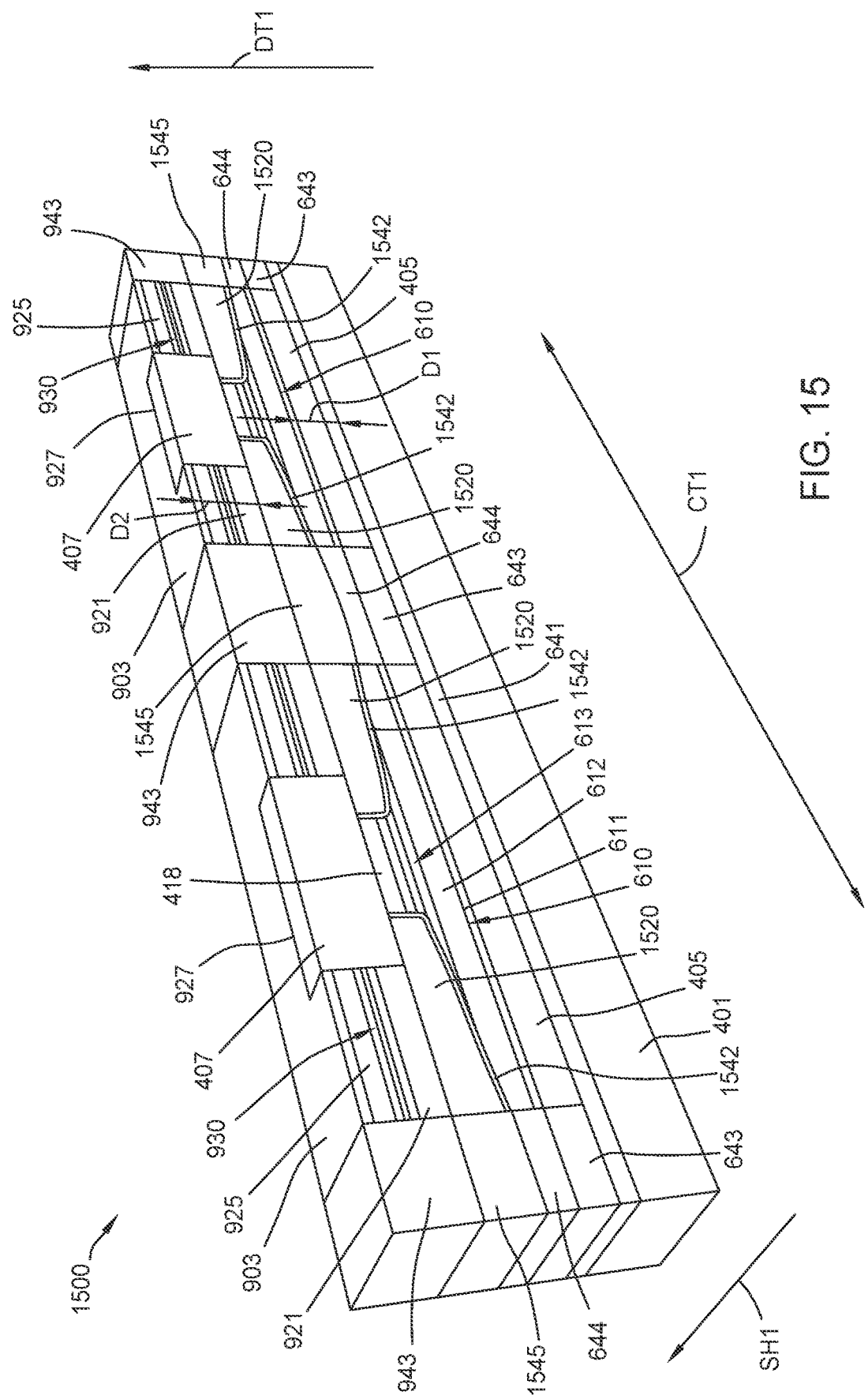
FIG. 15 is a schematic isometric media facing surface (MFS) view of a read head, according to one implementation.

FIG. 15 is a schematic isometric media facing surface (MFS) view of a read head 1500, according to one implementation. The read head 1500 is similar to the read head 600 shown in FIG. 6, and includes one or more of the aspects, features, components, and/or properties thereof. The read head 1500 is similar to the read head 900 shown in FIG. 9, and includes one or more of the aspects, features, components, and/or properties thereof. As an example, the read head 1500 combines the configurations of the read sensors 610 and the insulation layers 641, 643, 644 with the configurations of the insulation layers 943 and the trilayer structures 930.

In the implementation shown in FIG. 15, the first insulation layer 641 is disposed between the plurality of lower leads 405 and the lower shield 401, a plurality of second insulation layers 1542 are disposed between the first AFM layers 612 and a plurality of soft bias side shields 1520, a plurality of third insulation layers 1545 are disposed between and outwardly of the soft bias side shields 1520, and the insulation layers 943 (a plurality of fourth insulation layers in the implementation of FIG. 13) are disposed between and outwardly of the plurality of second AFM layers 925. The insulation layers 643 are a plurality of fifth insulation layers in the implementation shown in FIG. 15. The insulation layers 644 are a plurality of sixth insulation layers in the implementation shown in FIG. 15.

Figure 16:
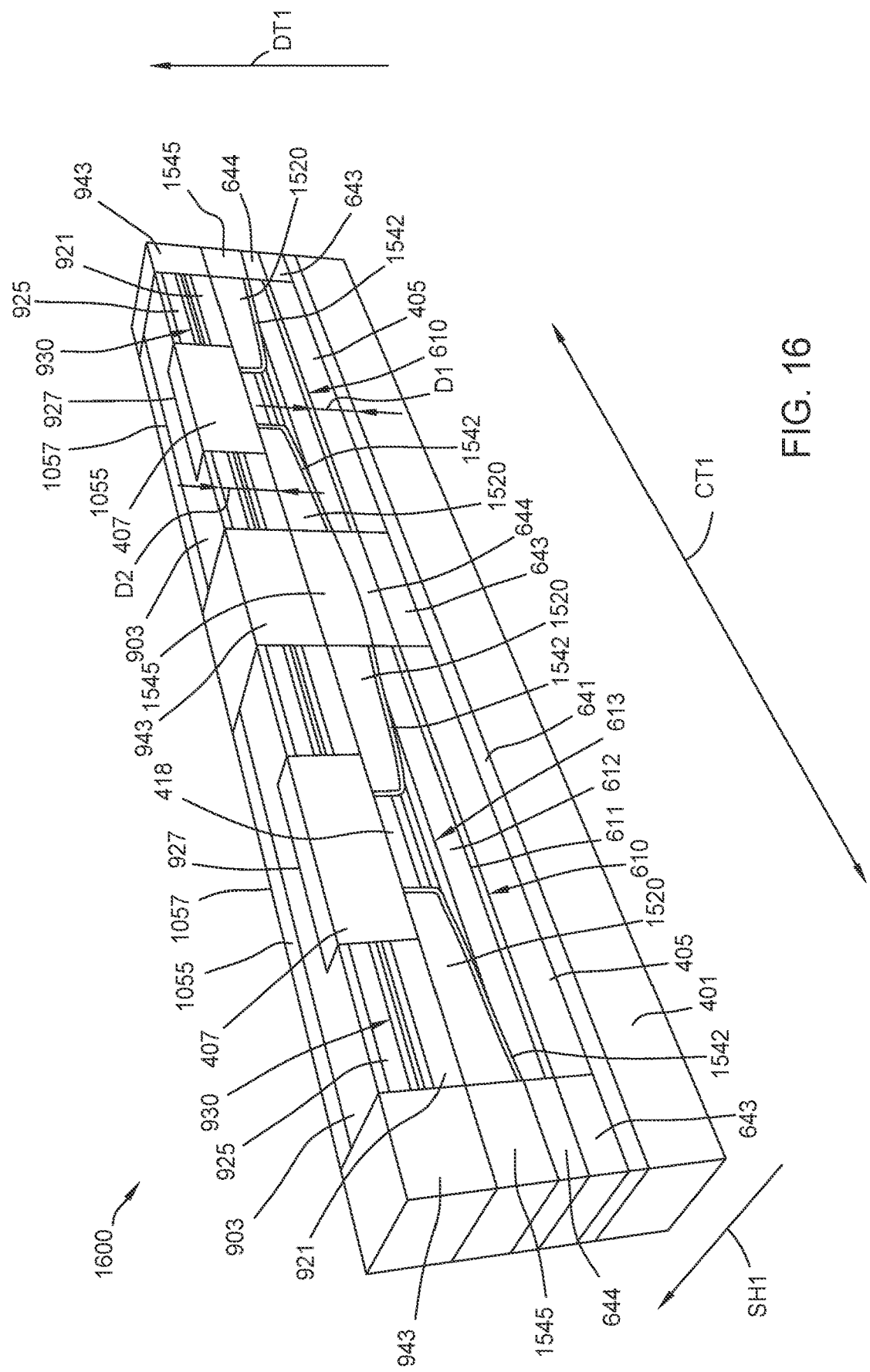
FIG. 16 is a schematic isometric media facing surface (MFS) view of a read head, according to one implementation.

FIG. 16 is a schematic isometric media facing surface (MFS) view of a read head 1600, according to one implementation. The read head 1600 is similar to the read head 1500 shown in FIG. 15, and includes one or more of the aspects, features, components, and/or properties thereof. The read head 1600 is similar to the read head 1000 shown in FIG. 10, and includes one or more of the aspects, features, components, and/or properties thereof. As an example, the read head 1600 combines the configurations of the insulation layers 1542, 1545 with the configurations of the second upper leads 1055.

FIGS. 17A-17J illustrate a schematic process flow of a method 1700 of forming at least a portion of a read head, according to one implementation. The method 1700 can be used, for example, to form at least a portion of the read head 400 shown in FIG. 4.

Figure 17B:
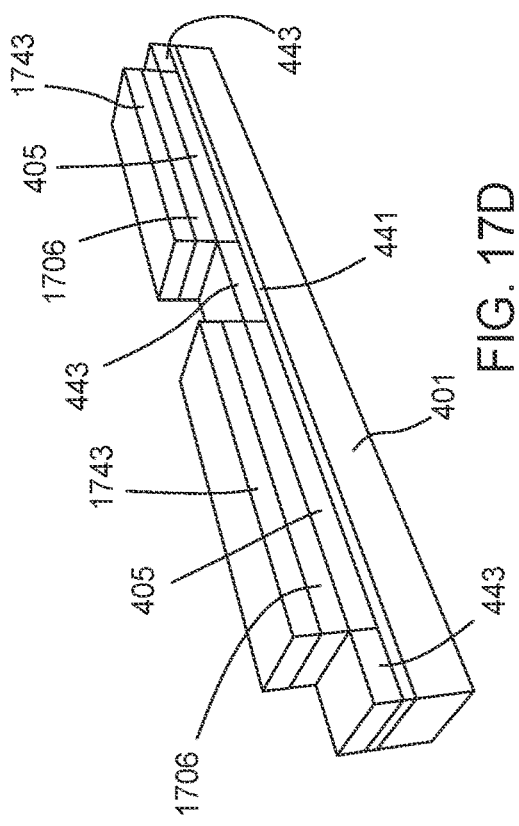
Figure 17D:
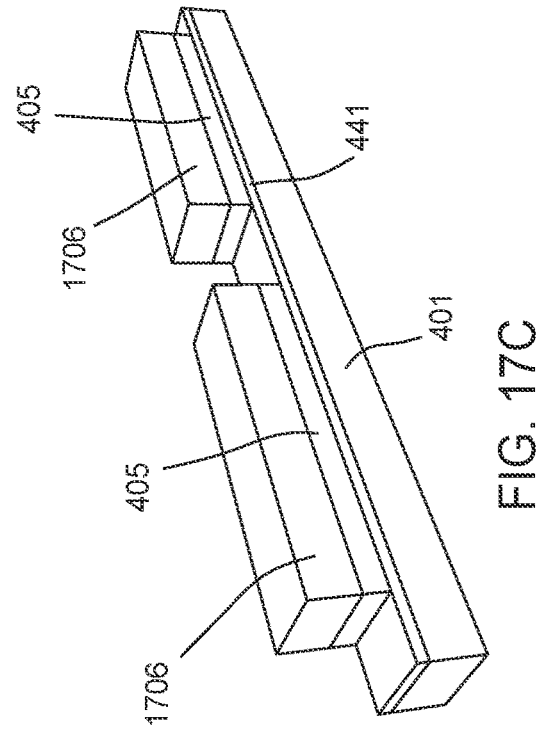
Figure 17A:
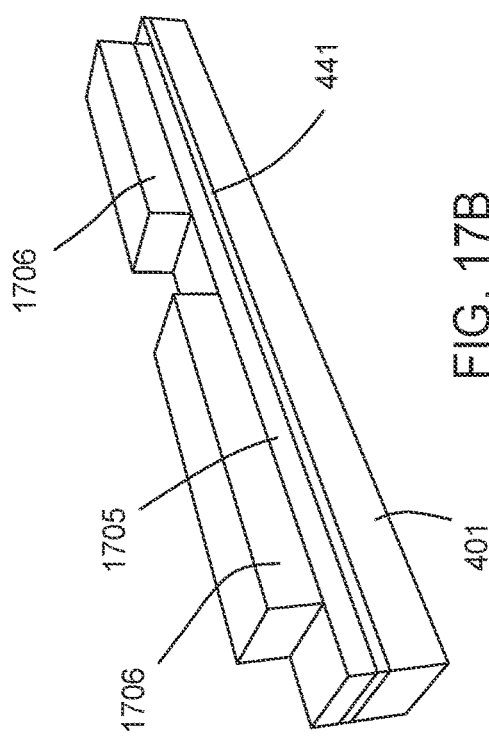

FIG. 17A shows forming of the lower shield 401, and forming of the first insulation layer 441 and a lower lead layer 1705 above the lower shield 401.

FIG. 17B shows forming of a plurality of photoresist layers 1706 on the lower lead layer 1705.

Figure 17C:
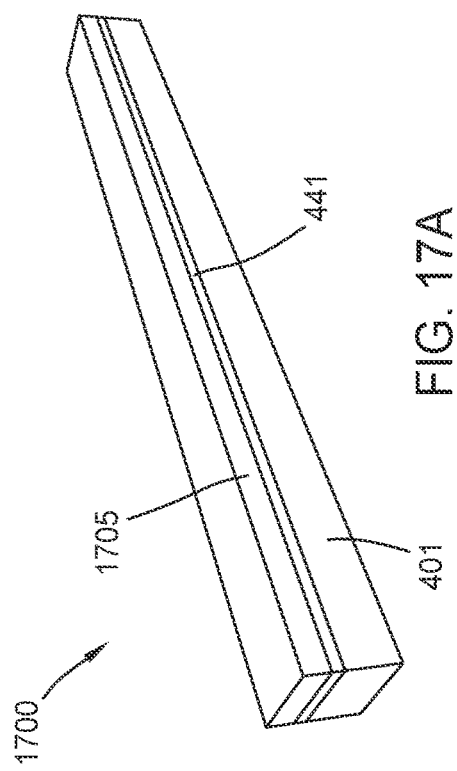

FIG. 17C shows removing of (e.g., milling) sections of the lower lead layer 1705 to form the plurality of lower leads 405. Portions of the photoresist layers 1706 can be removed in FIG. 17C.

FIG. 17D shows forming of the third insulation layers 443 between and outwardly of the plurality of lower leads 405. The forming includes forming of insulation layers 1743 on the photoresist layers 1706.

FIG. 17E shows removing (e.g., lifting off) of the insulation layers 1743 and the photoresist layers 1706.

FIG. 17F shows forming of a multilayer structure 1730 above the first insulation layer 441. The multilayer structure 1730 includes a first antiferromagnetic (AFM) layer 1712, and a free layer 1713.

FIG. 17G shows forming of photoresist layers 1731 on the multilayer structure 1730.

FIG. 17H shows removing (e.g, milling) of sections of the multilayer structure 1730 to form the plurality of read sensors 410. Portions of the photoresist layers 1731 are also removed in FIG. 17H. In FIG. 17H, at least a portion of each section of the multilayer structure 1730 is removed in a length L1 extending in an uptrack direction UT1 up to the plurality of lower leads 405 such that the first AFM layer 412 of each read sensor 410 is of the first width W1 along the crosstrack direction CT1 that is less than the second width W2 of each lower lead 405.

FIG. 17I shows forming of insulation layers 1742 between and outwardly of the plurality of read sensors 410, and forming of the plurality of soft bias side shields 420 between and outwardly of the plurality of read sensors 410. Soft bias layers 1733 are formed on the photoresist layers 1731.

FIG. 17J shows removing (e.g., chemical mechanical polishing) of the soft bias layers 1733 and the photoresist layers 1731. Portions of the insulation layers 1742 that are above the cap layers 418 are removed (e.g., chemically mechanically polished) to form the second insulation layers 442. The buffer layer 421 can then be formed above the read sensors 410 and the soft bias side shields 420, the trilayer structure 430 can be formed above buffer layer 421, the second AFM layer 425 can be formed above trilayer structure 430, and/or the upper shield 403 can be formed above the second AFM layer 425. One or more upper leads (such as the first upper leads 407) can then be formed.

FIGS. 18A-18I illustrate a schematic process flow of a method 1800 of forming at least a portion of a read head, according to one implementation. The method 1800 can be used, for example, to form at least a portion of the read head 600 shown in FIG. 6.

FIG. 18A shows forming of the lower shield 401, the first insulation layer 641, and a multilayer structure 1830. The multilayer structure 1830 includes a first AFM layer 1812 and a free layer 1813.

FIG. 18B shows forming of photoresist layers 1831 above the multilayer structure 1830.

FIG. 18C shows removing (e.g., milling) sections of the lower lead layer 1805 and the multilayer structure 1830 to form the plurality of lower leads 405 and a plurality of multilayers 1840.

FIG. 18D shows forming insulation layers 643, 1844 between and outwardly of the plurality of lower leads 405 and the plurality of multilayers 1840. Insulation layers 1833 are also formed on the photoresist layers 1831.

FIG. 18E shows removing (e.g., lifting off) of the insulation layers 1833 and the photoresist layers 1831.

FIG. 18F shows forming of photoresist layers 1835 on the multilayers 1840.

Figure 18G:
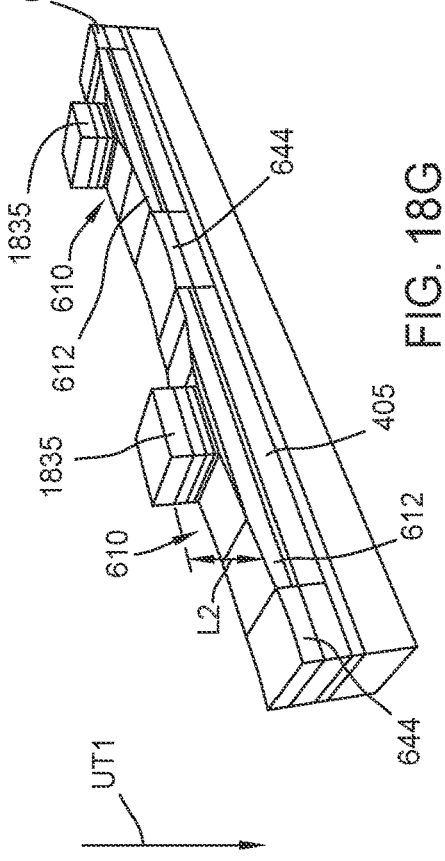

FIG. 18G shows removing (e.g, milling) of sections of the multilayers 1840 to form the plurality of read sensors 610. At least a portion of each of the plurality of multilayers 1840 is removed in a length L2 extending in the uptrack direction UT1 up to the first AFM layer of each read sensor such that the first AFM layer 612 of each read sensor 610 is of the first width W3 along the crosstrack direction CT1 that is substantially equal to, or (depending on the configuration) different than, the second width W2 of each lower lead 405. Portions of the photoresist layers 1835 can be removed (e.g., milled). Portions of the insulation layers 1844 are removed to form the fourth insulation layer 644. The present disclosure contemplates that the insulation layers 643, 644 can be combined as insulation layers.

Figure 18H:
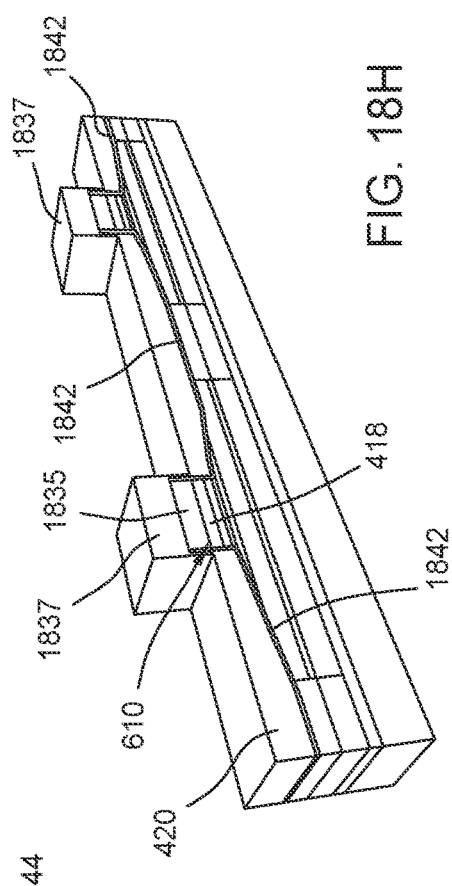

FIG. 18H shows forming of insulation layers 1842 between and outwardly of the plurality of read sensors 610, and forming of the plurality of soft bias side shields 420 between and outwardly of the plurality of read sensors 610. Soft bias layers 1837 are formed on the photoresist layers 1835.

Figure 18I:
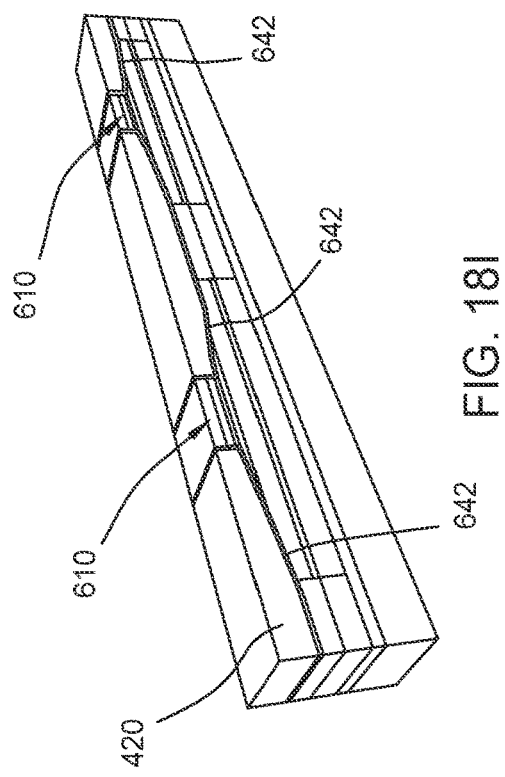

FIG. 18I shows removing (e.g., chemical mechanical polishing) of the soft bias layers 1837 and the photoresist layers 1835. Portions of the insulation layers 1842 that are above the cap layers 418 are removed (e.g., chemically mechanically polished) to form the second insulation layers 642. The buffer layer 421 can then be formed above the read sensors 610 and the soft bias side shields 420, the trilayer structure 430 can be formed above buffer layer 421, the second AFM layer 425 can be formed above trilayer structure 430, and/or the upper shield 403 can be formed above the second AFM layer 425. One or more upper leads (such as the first upper leads 407) can then be formed.

FIGS. 19A-19E illustrate a schematic process flow of a method 1900 of forming at least a portion of a read head, according to one implementation. The method 1900 can be used, for example, to form at least a portion of the read head 900 shown in FIG. 9 and/or at least a portion of the read head 1000 shown in FIG. 10.

Figure 19A:
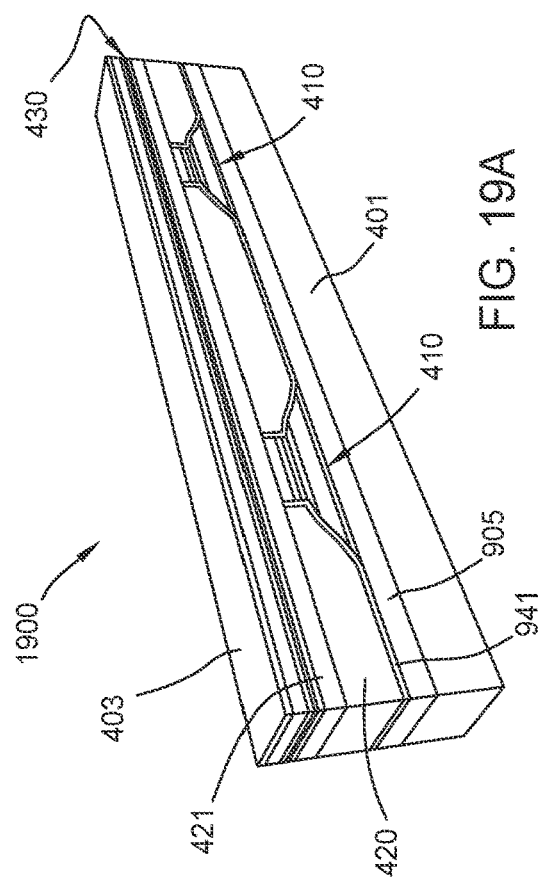
FIGS. 19A-19E illustrate a schematic process flow of a method of forming at least a portion of a read head, according to one implementation.

FIG. 19A shows the lower shield 401, the one or more lower leads 905, the first insulation layers 941, the read sensors 410, the soft bias side shields 420, the buffer layer 421, the trilayer structure 430, the second AFM layer 425, and the upper shield 403 formed.

Figure 19C:
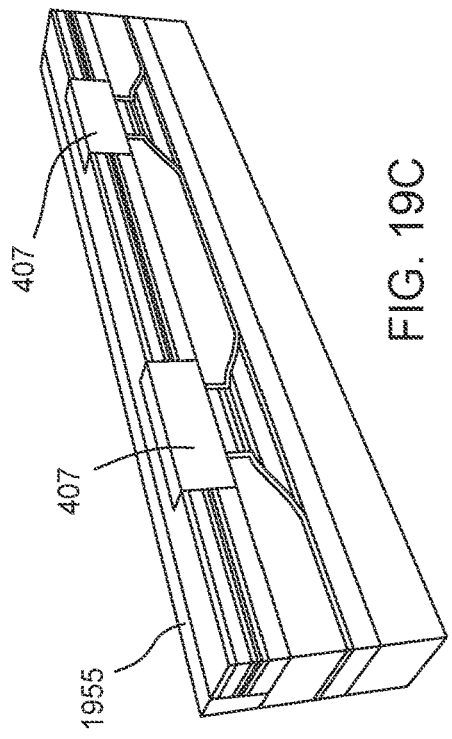
Figure 19E:
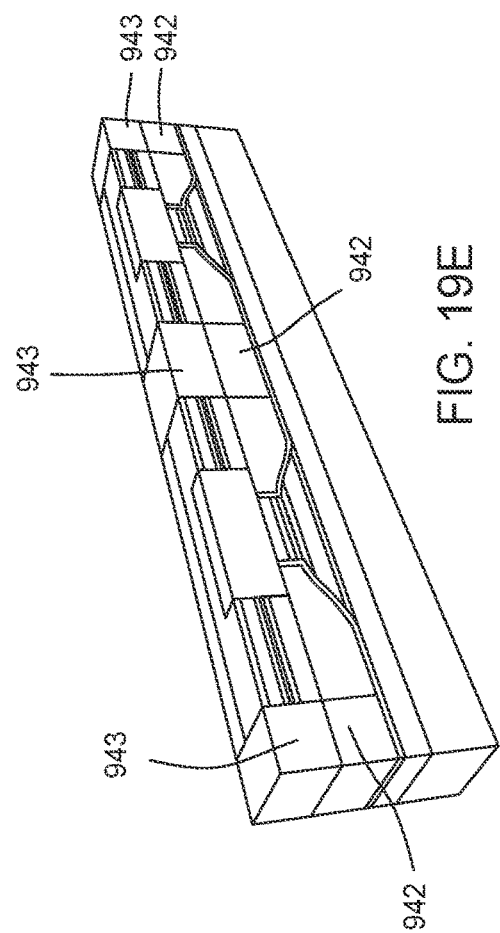
Figure 19B:
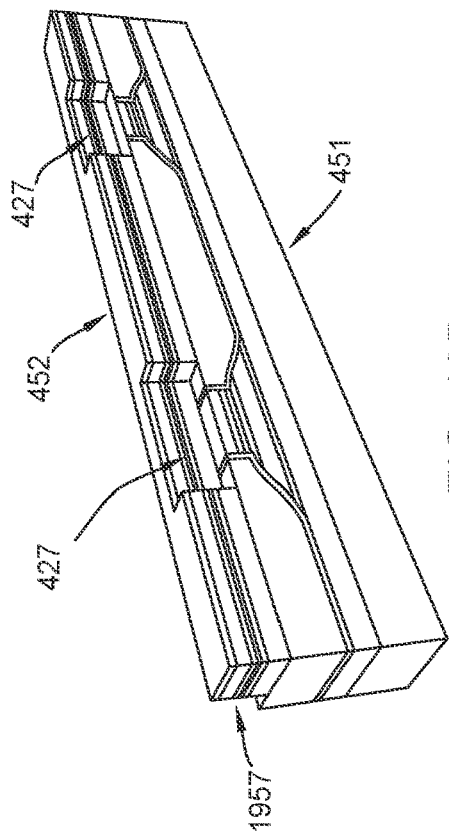

FIG. 19B shows removing (e.g., milling) first sections of the upper shield 403 and the second AFM layer 425 to form the first recesses 427 on the first stripe side 451. FIG. 19B shows removing (e.g., milling) a second section of the upper shield 403 and the second AFM layer 425 to form a second recess 1957 on the second stripe side 452.

FIG. 19C shows forming the plurality of first upper leads 407 in the plurality of first recesses 427 on the first stripe side 451, and forming a second upper lead 1955 in the second recess 1957 on the second stripe side 452.

Figure 19D:
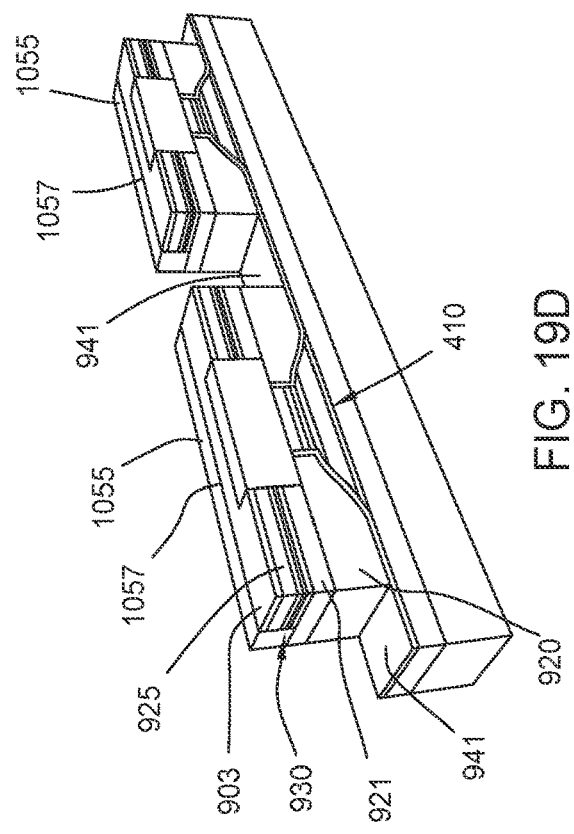

FIG. 19D shows removing (e.g., milling, such as by using photoresist layers) sections of the upper shield 403, the second AFM layer 425, the second upper lead 1955 (if used), and the plurality of soft bias side shields 420 disposed between and outwardly of the plurality of first upper leads 407. The removing in FIG. 19D forms the soft bias side shields 920, the buffer layers 921, the trilayer structures 930, the upper shields 903, the plurality of second upper leads 1055, the plurality of second recesses 1057, and the second AFM layers 925.

FIG. 19E shows forming the insulation layers 942, 943 between and outwardly of the plurality of first upper leads 407. The present disclosure contemplates that the insulation layers 942, 943 can be combined as insulation layers.

FIGS. 20A-20C illustrate a schematic process flow of a method 2000 of forming at least a portion of a read head, according to one implementation. The method 2000 can be used, for example, to form at least a portion of the read head 1100 shown in FIG. 11 and/or at least a portion of the read head 1200 shown in FIG. 12.

FIG. 20A shows the lower shield 401, the one or more lower leads 905, the first insulation layers 941, the read sensors 1110, the soft bias side shields 420, the buffer layer 421, the trilayer structure 430, the second AFM layer 425, the first upper leads 407, and the upper shield 403 formed.

FIG. 20B shows removing (e.g., milling, such as by using photoresist layers) sections of the upper shield 403, the second AFM layer 425, and the plurality of soft bias side shields 420 disposed between and outwardly of the plurality of first upper leads 407. The removing in FIG. 20B forms the soft bias side shields 920, the buffer layers 921, the trilayer structures 930, the upper shields 903, and the second AFM layers 925.

FIG. 20C shows forming the insulation layers 942, 943 between and outwardly of the plurality of first upper leads 407. The present disclosure contemplates that the insulation layers 942, 943 can be combined as insulation layers.

Benefits of the present disclosure include using soft bias side shields in tape drives to facilitate low coercivity, enhanced magnetic reading operations (such as higher reading density), shape anisotropy, stability of the soft bias elements, reduced signal shunting, and enhanced device performance.

It is contemplated that one or more aspects disclosed herein may be combined. As an example, the present disclosure contemplates that aspects of the storage device 100, the read head 400, the read head 500, the read head 600, the read head 700, the read head 900, the read head 1000, the read head 1100, the read head 1200, the read head 1300, the read head 1400, the read head 1500, the read head 1600, the method 1700, the method 1800, the method 1900, and/or the method 2000 may be combined. Moreover, it is contemplated that one or more aspects disclosed herein may include some or all of the aforementioned benefits.

Two read sensors are shown for the read heads in each of the Figures for exemplary purposes. The present disclosure contemplates that the read heads can include additional read sensors. For example, the read heads can each include sixteen read sensors. The implementation shown in FIG. 4, the read head 400 is shown as having two read sensors 410 as an example. The present disclosure contemplates that the read head 400 can include additional read sensors 410. For example the read head 400 can include sixteen read sensors 410 in the configuration shown in FIG. 4.

In one implementation, a read head for magnetic storage devices includes a lower shield, an upper shield, and a plurality of lower leads disposed between the lower shield and the upper shield. The read head includes a plurality of upper leads disposed above the plurality of lower leads along a downtrack direction. The upper shield is disposed at least partially between the plurality of upper leads. Each of the plurality of upper leads and each of the plurality of lower leads is nonmagnetic and conductive. The read head includes a plurality of read sensors disposed between the plurality of lower leads and the plurality of upper leads. Each read sensor of the plurality of read sensors includes a multilayer structure. The multilayer structure includes a first antiferromagetic (AFM) layer and a free layer. The read head includes a plurality of soft bias side shields disposed between and outwardly of the plurality of read sensors, and a second AFM layer disposed between the upper shield and the plurality of soft bias side shields. The second AFM layer is formed of iridium manganese (IrMn).

The read head includes a trilayer structure disposed between the second AFM layer and the plurality of soft bias side shields. The trilayer structure includes two layers separated by a spacer layer, and the two layers are each formed of one or more of cobalt iron (CoFe) or boron (B). The second AFM layer has a rectangular cross section in a plane defined by a crosstrack direction and the downtrack direction. A buffer layer of each read sensor is disposed at a first distance relative to the lower shield. A cap layer of each read sensor is disposed at a second distance relative to the upper shield that is substantially equal to the first distance. Each upper lead of the plurality of upper leads is disposed in a plurality of recesses formed in the upper shield, the two layers, the spacer layer, and the second AFM layer. In one example, a first insulation layer is disposed between the plurality of lower leads and the lower shield, a plurality of second insulation layers are disposed between the plurality of lower leads and the plurality of soft bias side shields, and a plurality of third insulation layers are disposed between and outwardly of the plurality of lower leads. In one example, a first insulation layer is disposed between the plurality of lower leads and the lower shield, a plurality of second insulation layers disposed between the first AFM layers of the plurality of read sensors and the plurality of soft bias side shields, and a plurality of third insulation layers disposed between and outwardly of the plurality of lower leads. The plurality of upper leads include a plurality of first upper leads on a first stripe side and a second upper lead on a second stripe side, the first stripe side and the second stripe side opposing each other along a stripe height direction. In one example, the first AFM layer of each read sensor is of a first width along a crosstrack direction, and each lower lead of the plurality of lower leads is of a second width that is greater than the first width. In one example, the first AFM layer of each read sensor is of a first width along a crosstrack direction, and each lower lead of the plurality of lower leads is of a second width that is substantially equal to, or (depending on the configuration) different than, the first width. A magnetic storage device including the read head is also disclosed.

In one implementation, a read head for magnetic storage devices includes a lower shield, a plurality of upper shields, and one or more lower leads disposed between the lower shield and the plurality of upper shields. The read head includes a plurality of upper leads disposed above the one or more lower leads along a downtrack direction. Each of the one or more lower leads and each of the plurality of upper leads is conductive. The read head includes a plurality of read sensors disposed between the one or more lower leads and the plurality of upper leads. Each read sensor of the plurality of read sensors includes a multilayer structure. The multilayer structure includes a first antiferromagnetic (AFM) layer a free layer. The read head includes a plurality of soft bias side shields disposed among the plurality of read sensors; and a plurality of second AFM layers disposed between the plurality of upper shields and the plurality of soft bias side shields. In one example, the first AFM layer of each read sensor is a part of a common AFM layer spanning the plurality of read sensors. In one example, the one or more lower leads include a common lower lead spanning the plurality of read sensors. In one example, the one or more lower leads include a plurality of lower leads. In one example, a plurality of first insulation layers are disposed between the common lower lead and the plurality of soft bias side shields, a plurality of second insulation layers are disposed between and outwardly of the plurality of soft bias side shields, a plurality of third insulation layers are disposed between and outwardly of the plurality of second AFM layers, and the plurality of third insulation layers are disposed between and outwardly of the plurality of upper leads. In one example, a first insulation layer is disposed between the plurality of lower leads and the lower shield, a plurality of second insulation layers are disposed between the plurality of lower leads and the plurality of soft bias side shields, a plurality of third insulation layers are disposed between and outwardly of the plurality of soft bias side shields, and a plurality of fourth insulation layers are disposed between and outwardly of the second plurality of AFM layers. A magnetic storage device including the read head is also disclosed.

In one implementation, a method of forming a read head for magnetic storage devices includes forming a lower shield, and forming a lower lead layer above the lower shield. The method includes forming a multilayer structure above the lower lead layer, the multilayer structure includes a first antiferromagnetic (AFM) layer and a free layer. The method includes removing sections of the multilayer structure to form a plurality of read sensors. The method includes forming a plurality of soft bias side shields disposed between and outwardly of the plurality of read sensors, and forming a second AFM layer above the plurality of soft bias side shields. The method includes forming an upper shield above the second AFM layer, and forming one or more upper leads. The lower lead layer and each of the one or more upper leads is nonmagnetic and conductive. In one example the method includes forming a first insulation layer above the lower shield, forming a plurality of second insulation layers between and outwardly of the plurality of read sensors, removing sections of the lower lead layer to form a plurality of lower leads prior to forming the multilayer structure, and forming a plurality of third insulation layers between and outwardly of the plurality of lower leads prior to forming the multilayer structure. The removing sections of the multilayer structure to form the plurality of read sensors includes removing at least a portion of each section of the multilayer structure in a length extending in an uptrack direction up to the plurality of lower leads such that the first AFM layer of each read sensor is of a first width along a crosstrack direction that is less than a second width of each lower lead of the plurality of lower leads. In one example the method includes, prior to removing sections of the multilayer structure to form the plurality of read sensors, removing sections of the lower lead layer and the multilayer structure to form a plurality of lower leads and a plurality of multilayers, and forming insulation layers between and outwardly of the plurality of lower leads and the plurality of multilayers. The removing sections of the multilayer structure to form the plurality of read sensors includes removing at least a portion of each of the plurality of multilayers in a length extending in an uptrack direction up to the first AFM layer of each read sensor such that the first AFM layer of each read sensor is of a first width along a crosstrack direction that is substantially equal to, or (depending on the configuration) different than, a second width of each lower lead of the plurality of lower leads. In one example, the method includes removing first sections of the upper shield and the second AFM layer to form a plurality of first recesses on a first stripe side. The forming one or more upper leads comprises forming a plurality of first upper leads in the plurality of first recesses on the first stripe side. In one example, the method includes removing a second section of the upper shield and the second AFM layer to form a second recess on a second stripe side. The forming one or more upper leads further comprises forming a second upper lead in the second recess on the second stripe side. In one example the method includes, after the forming the plurality of upper leads, removing sections of the upper shield, the second AFM layer, and the plurality of soft bias side shields disposed between and outwardly of the plurality of upper leads, and forming insulation layers between and outwardly of the plurality of upper leads.

While the foregoing is directed to embodiments of the present disclosure, other and further embodiments of the disclosure may be devised without departing from the basic scope thereof, and the scope thereof is determined by the claims that follow.

What is claimed is:

1. A read head for magnetic storage devices, comprising:
   a lower shield;
   an upper shield;
   a plurality of lower leads disposed between the lower shield and the upper shield;
   a plurality of upper leads disposed above the plurality of lower leads along a downtrack direction, wherein the upper shield is disposed at least partially between the plurality of upper leads, and each of the plurality of upper leads and each of the plurality of lower leads is nonmagnetic and conductive;
   a plurality of read sensors disposed between the plurality of lower leads and the plurality of upper leads, each read sensor of the plurality of read sensors comprising a multilayer structure, the multilayer structure comprising:
      a first antiferromagnetic (AFM) layer, and
      a free layer;
   a plurality of soft bias side shields disposed between and outwardly of the plurality of read sensors; and
   a second AFM layer disposed between the upper shield and the plurality of soft bias side shields.

2. The read head of claim 1, wherein the second AFM layer is formed of iridium manganese (IrMn).

3. The read head of claim 2, further comprising a trilayer structure disposed between the second AFM layer and the plurality of soft bias side shields.

4. The read head of claim 3, wherein:
   the trilayer structure comprises two layers separated by a spacer layer, and the two layers are each formed of one or more of cobalt iron (CoFe) or boron (B);
   the second AFM layer has a rectangular cross section in a plane defined by a crosstrack direction and the downtrack direction;
   a buffer layer of each read sensor is disposed at a first distance relative to the lower shield; and
   a cap layer of each read sensor is disposed at a second distance relative to the upper shield that is substantially equal to the first distance.

5. The read head of claim 4, wherein each upper lead of the plurality of upper leads is disposed in a plurality of recesses formed in the upper shield, the two layers, the spacer layer, and the second AFM layer.

6. The read head of claim 1, further comprising a first insulation layer disposed between the plurality of lower leads and the lower shield, a plurality of second insulation layers disposed between the plurality of lower leads and the plurality of soft bias side shields, and a plurality of third insulation layers disposed between and outwardly of the plurality of lower leads.

7. The read head of claim 6, wherein the first AFM layer of each read sensor is of a first width along a crosstrack direction, and each lower lead of the plurality of lower leads is of a second width that is greater than the first width.

8. The read head of claim 7, wherein the plurality of upper leads comprise a plurality of first upper leads on a first stripe side and a second upper lead on a second stripe side, the first stripe side and the second stripe side opposing each other along a stripe height direction.

9. The read head of claim 1, further comprising a first insulation layer disposed between the plurality of lower leads and the lower shield, a plurality of second insulation layers disposed between the first AFM layers of the plurality of read sensors and the plurality of soft bias side shields, and a plurality of third insulation layers disposed between and outwardly of the plurality of lower leads.

10. The read head of claim 9, wherein the first AFM layer of each read sensor is of a first width along a crosstrack direction, and each lower lead of the plurality of lower leads is of a second width that is substantially equal to the first width.

11. A magnetic storage device comprising the read head of claim 1.

* * * * *